US006837361B2

(12) United States Patent
Singleton et al.

(10) Patent No.: US 6,837,361 B2
(45) Date of Patent: Jan. 4, 2005

(54) DIVERTER FOR DUAL TRACK AIR ASSISTED COLLATOR

(75) Inventors: John Mark Singleton, Trophy Club, TX (US); Mark A. Ritter, Garland, TX (US)

(73) Assignee: Dallas A.C. Horn & Co., Dallas, TX (US)

(*) Notice: Subject to any disclaimer, the term of this patent is extended or adjusted under 35 U.S.C. 154(b) by 0 days.

(21) Appl. No.: 10/774,999

(22) Filed: Feb. 5, 2004

(65) Prior Publication Data

US 2004/0168885 A1 Sep. 2, 2004

Related U.S. Application Data

(63) Continuation of application No. 10/087,008, filed on Mar. 4, 2002, now Pat. No. 6,688,455, which is a continuation-in-part of application No. 09/617,303, filed on Jul. 17, 2000, now Pat. No. 6,382,391, which is a continuation-in-part of application No. 09/361,549, filed on Jul. 27, 1999, now Pat. No. 6,244,018, which is a continuation-in-part of application No. 08/883,843, filed on Jun. 27, 1997, now Pat. No. 5,941,365.

(51) Int. Cl.[7] .......................... B65G 47/26; B65G 47/68
(52) U.S. Cl. ...................... 198/436; 198/427; 198/428; 198/438

(58) Field of Search ................................ 198/401, 409, 198/412, 427, 428, 438, 436

(56) References Cited

U.S. PATENT DOCUMENTS

| 3,512,336 | A | * | 5/1970 | Rosecrans | 198/436 |
| 4,135,616 | A | * | 1/1979 | Pellaton | 198/418.9 |
| 4,718,534 | A | * | 1/1988 | Harper | 198/401 |
| 5,460,481 | A | * | 10/1995 | Prakken | 414/798.5 |
| 6,223,884 | B1 | * | 5/2001 | Ronchi | 198/431 |
| 6,564,927 | B2 | * | 5/2003 | Meyer | 198/435 |

* cited by examiner

Primary Examiner—Gene O. Crawford
(74) Attorney, Agent, or Firm—Michael A. O'Neil

(57) ABSTRACT

A collator includes a first conveyor having a discharge end and a second receiving conveyor positioned below the discharge end of the first conveyor. As each product bag falls toward the second conveyor, an air blast assists in uprighting the bag. The second conveyor may be temporarily operated at a high speed to separate the product bags into groups. A deflector may be mounted at the discharge end of the second conveyor for directing product bags into containers. A diverter may be used to direct incoming product bags between parallel conveyors.

1 Claim, 51 Drawing Sheets

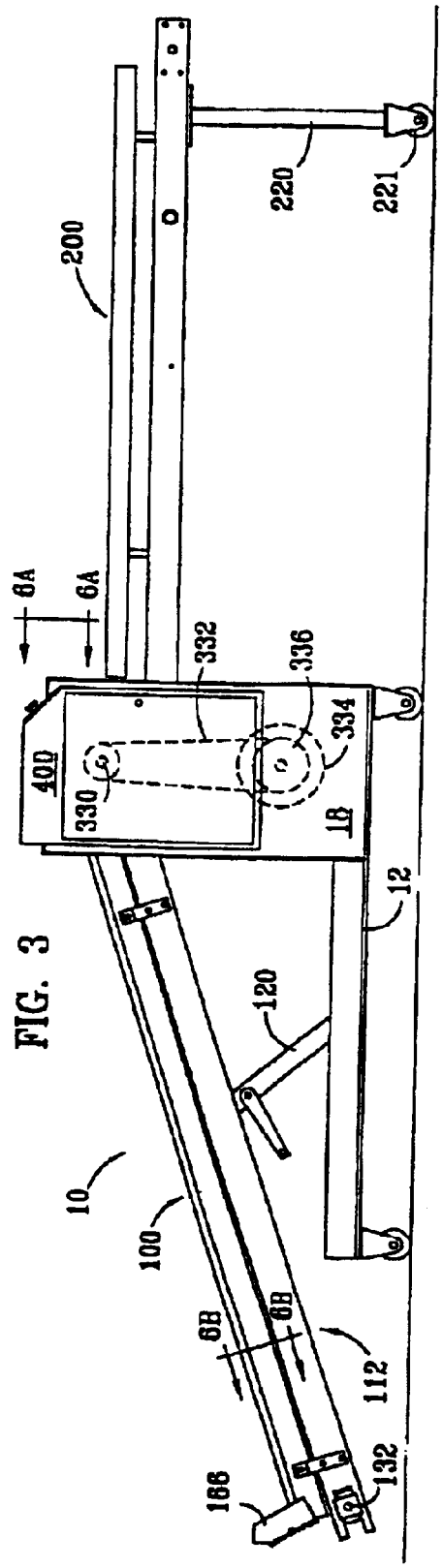
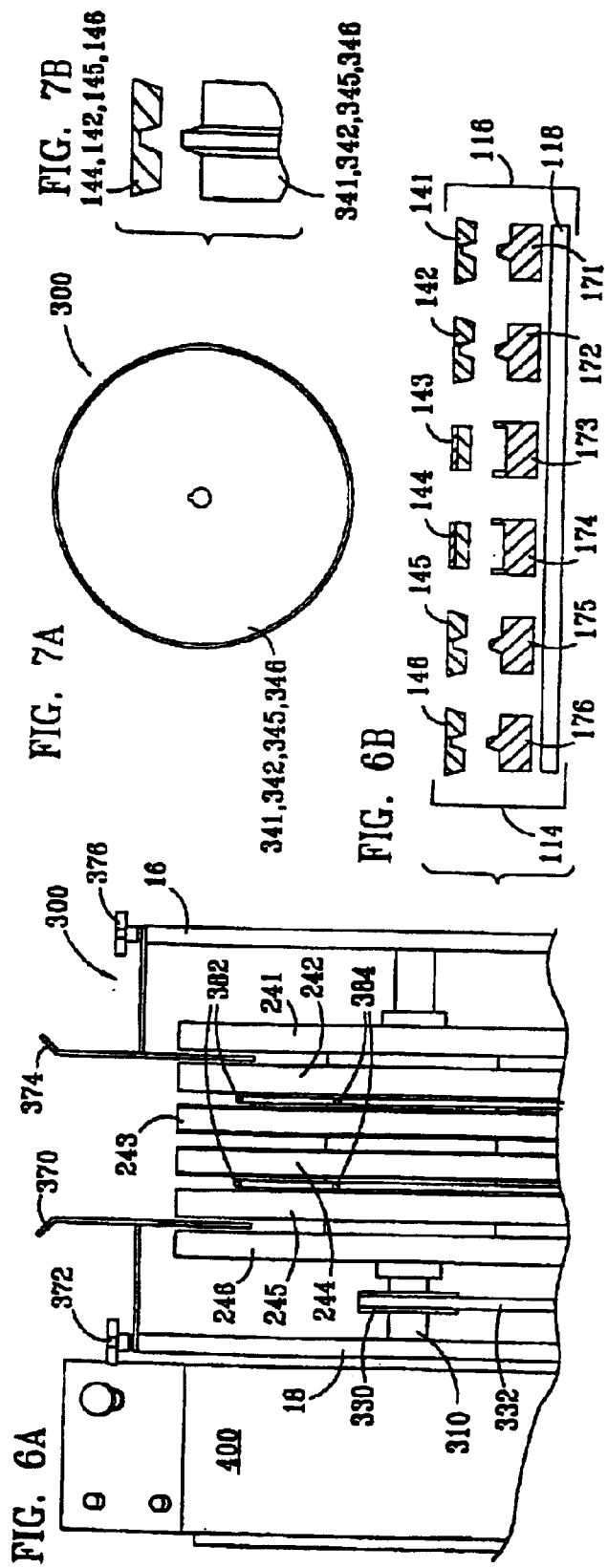

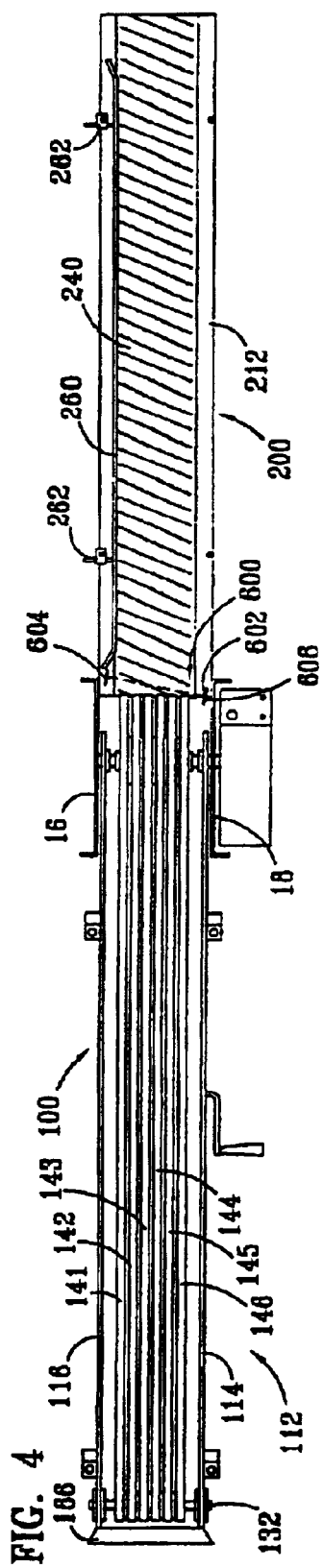
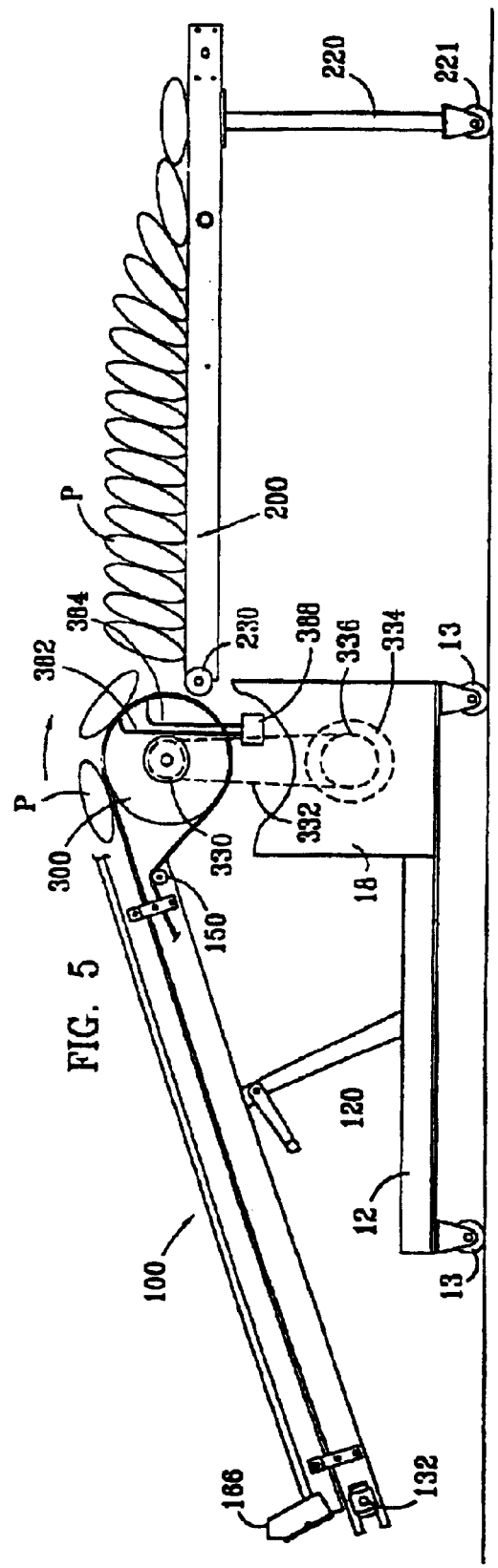

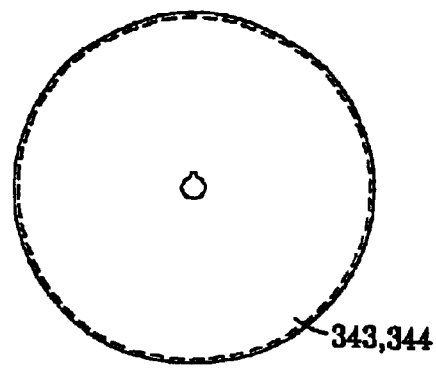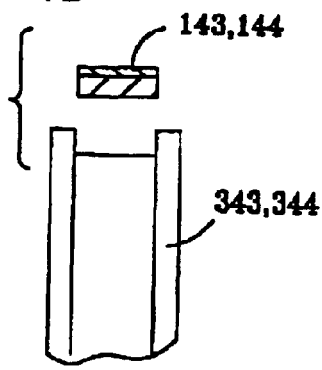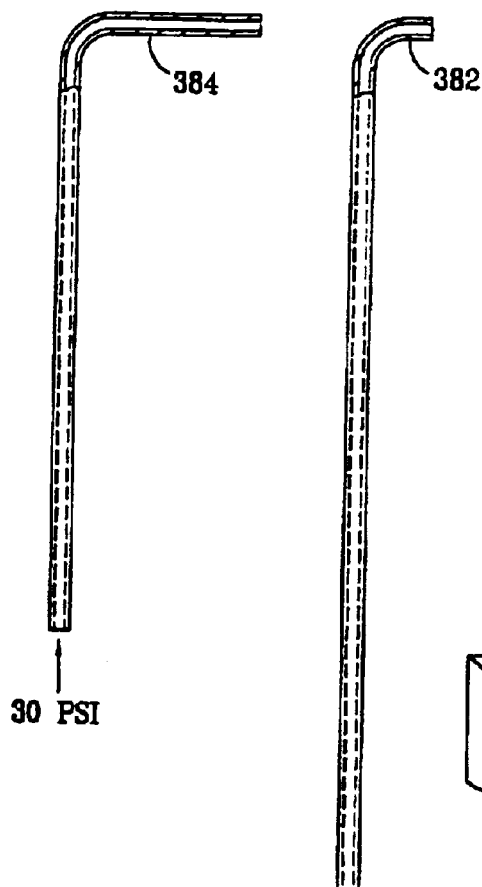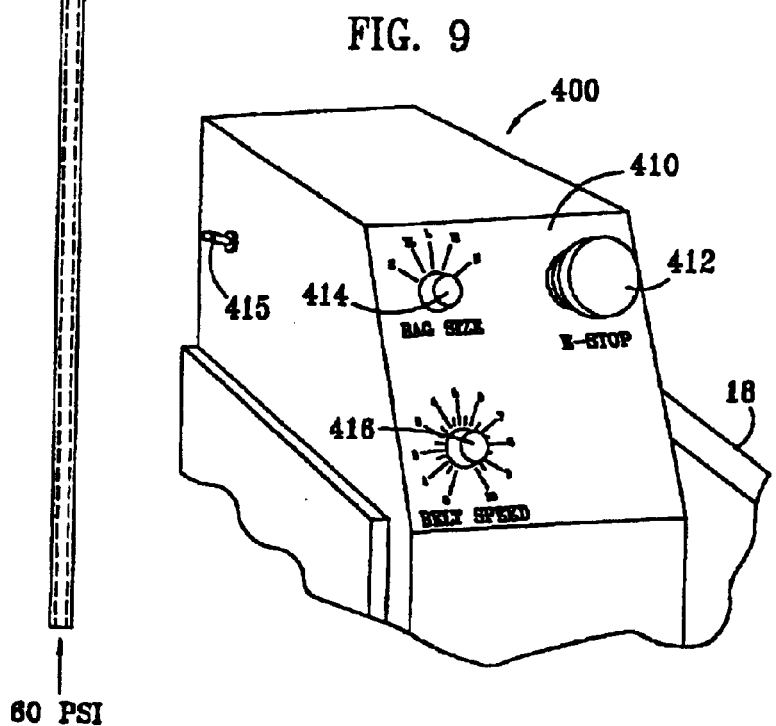

AIR ASSISTED COLLATOR PROGRAM LISTING

```
Rung 2:0
     Index PE            Bag Index              Index
                         Timer                  Delay Tmr
        I:0                 T4:1                +TOM-------+
   +---]/[---+----------+---]/[---+----+TIMER ON DELAY  +(EN)+
        8                   DN         | Timer      T4:0+(DN)|
                                       | Time Base   0.01|
                                       | Preset         0|
                                       | Accum          0|
                                       +----------------+
     Index                             Blast
     Delay Tmr                         Enable Tmr
        T4:0                           +TOM-------+
   +---]/[---+                     +--+TIMER ON DELAY  +(EN)+
        EN                            | Timer      T4:4+(DN)|
                                      | Time Base   0.01|
                                      | Preset        50|
                                      | Accum          0|
                                      +----------------+

Rung 2:1
     Index
     Delay Tmr                         Bag Index
        T4:0                           Timer
                                       +TOM--------+
   +----] [--------------------------- +TIMER ON DELAY  +(EN)-
        DN                             | Timer      T4:1+(DN)|
                                       | Time Base   0.01|
                                       | Preset         0|
                                       | Accum          0|
                                       +----------------+

Rung 2:2
     Rotary Sw
     Continuous                                  Index ST
        I:0                                         O:0
   +---] [---+--------------------------+----( )---+
        4                                           0
     Bag Index                                   Index SP
     Timer                                          O:0
        T4:1                                    +---( )---+
   +---] [---+                                           1
        TT
     Job PB
        I:0
   +---] [---+
        5
```

FIG. 12A

AIR ASSISTED COLLATOR PROGRAM LISTING
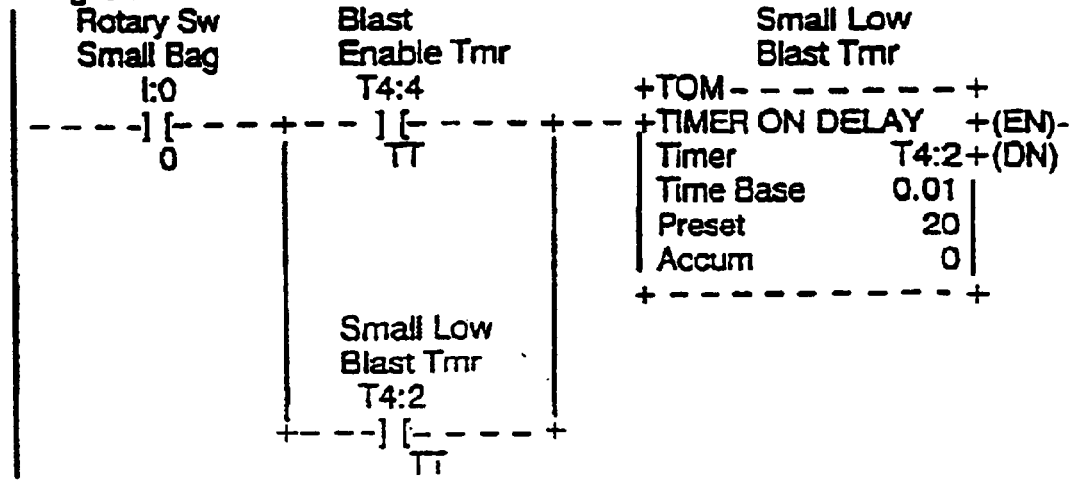
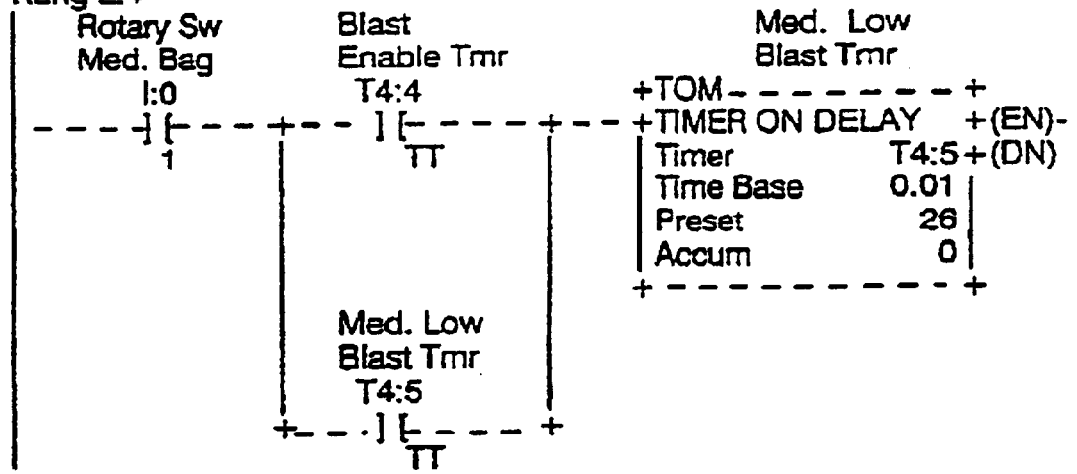
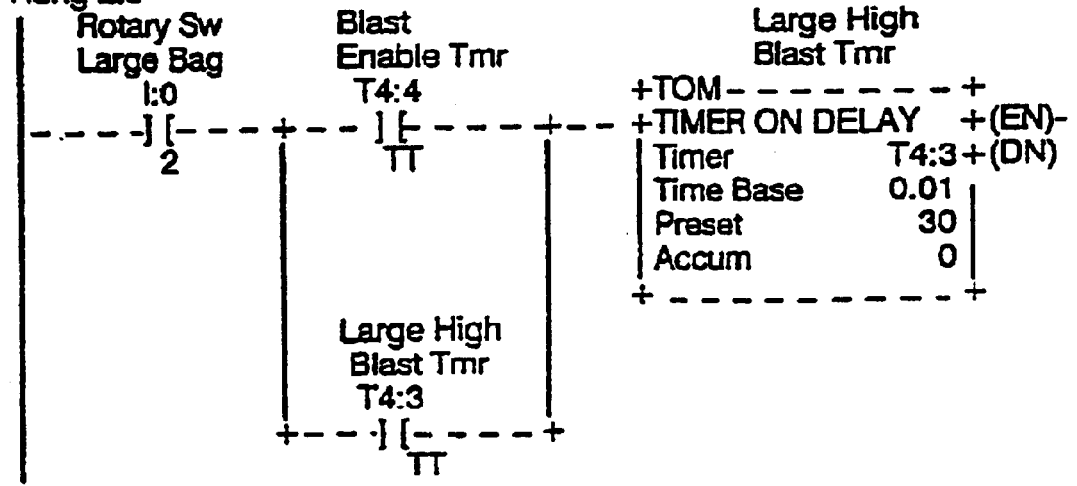
FIG. 12B

AIR ASSISTED COLLATOR
PROGRAM LISTING

```
Rung 2:6
  Rotary Sw         Blast                    XL High
  XL Bag            Enable Tmr               Blast Tmr
  I:0               T4:4                    +TOM---------+
  ---] [---+---] [-------+-----------------+TIMER ON DELAY  +(EN)-
        3          TT    |                  |Timer        T4:6 +(DN)
                         |                  |Time Base    0.01
                         |                  |Preset         40
                         |                  |Accum           0
                         |                  +-------------+
                         |  XL High
                         |  Blast Tmr
                         |  T4:6
                         +---] [----+
                              TT Rung 2:7
  Small Low                                            Low Blast
  Blast Tmr
  T4:2                                                   0:0
  +---] [---+-------------------------------------------( )---
        TT  |                                              2
  Med. Low  |
  Blast Tmr |
  T4:5      |
  +---] [---+
        TT Rung 2:8
  Large High                                          High Blast
  Blast Tmr
  T4:3                                                   0:0
  +---] [---+-------------------------------------------( )
        TT  |                                              3
  XL High   |
  Blast Tmr |
  T4:6      |
  +---] [---+
        TT Rung 2:9
  Rotary Sw     Small Bag                      Adjust
  Small Bag     One Shot                       Delay Tmr
  I:0           B3                            +NOV--------+
  ---] [-------(OSR)--------------+---------+ +MOVE       +
       0         100              |          |Source    10
                                  |          |Dest   T4:0.PRE
                                  |          |           0
                                  |          +-----------+
```

FIG. 12C

AIR ASSISTED COLLATOR PROGRAM LISTING

```
                                    +++                              +++
                                    |    Adjust                       |
                                    |    Index Tmr                    |
                                    +NOV--------+                     |
                                  + +NOVE                  ++
                                    | Source         50 |
                                    |                   |
                                    | Dest      T4:1.PRE|
                                    |                  0|
                                    +------------------+

Rung 2:10
  Rotary Sw    Med Bag                      Adjust
  Med Bag      One Shot                     Delay Tmr
    I:0          B3                         +NOV-----+
  ---] [---------[CSR]-------------+--+NOVE        +  +
        1           101            |  | Source      15|
                                   |  |               |
                                   |  | Dest   T4:0.PRE
                                   |  |              0|
                                   |  +--------------+
                                   |       Adjust
                                   |       Index Tmr
                                   |       +NOV-----+
                                   +-- +NOVE        +  +
                                          | Source      63|
                                          |               |
                                          | Dest   T4:1:PRE
                                          |              0|
                                          +--------------+

Rung 2:11
  Rotary Sw    Large Bag                    Adjust
  Large Bag    One Shot                     Delay Tmr
    I:0          B3                         +NOV-----+
  ---] [---------[OSR]-------------+--+NOVE        +  +
        2           102            |  | Source      20|
                                   |  |               |
                                   |  | Dest   T4:0.PRE
                                   |  |              0|
                                   |  +--------------+
                                   |       Adjust
                                   |       Index Tmr
                                   |       +NOV-----+
                                   +-- +NOVE        +--+
                                          | Source      75|
                                          |               |
                                          | Dest   T4:1:PRE
                                          |              0|
                                          +--------------+
```

FIG. 12D

AIR ASSISTED COLLATOR PROGRAM LISTING
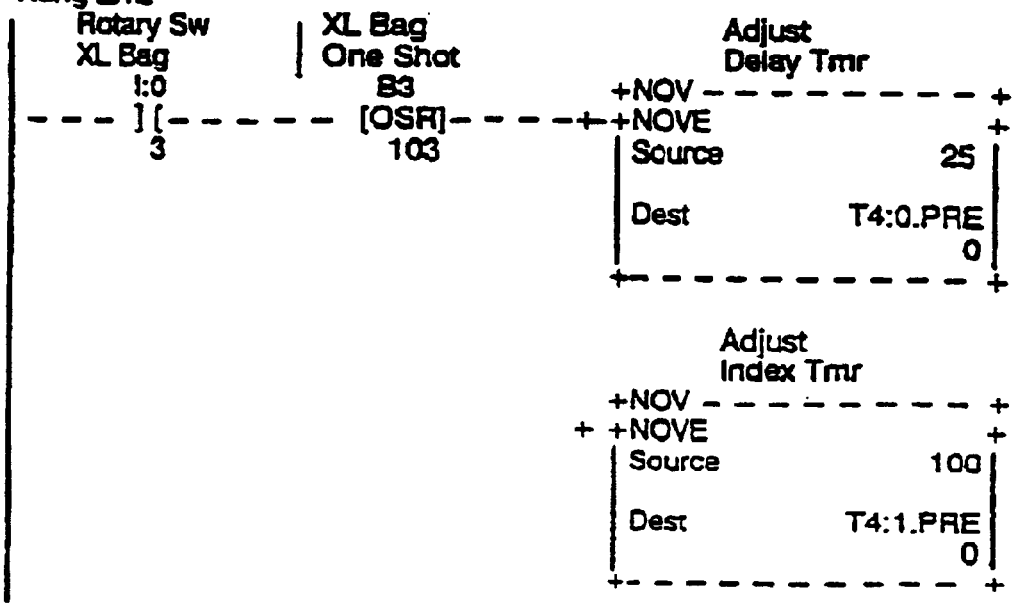
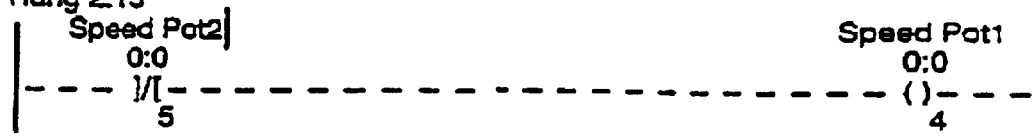
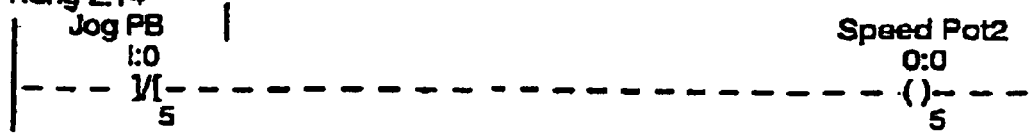
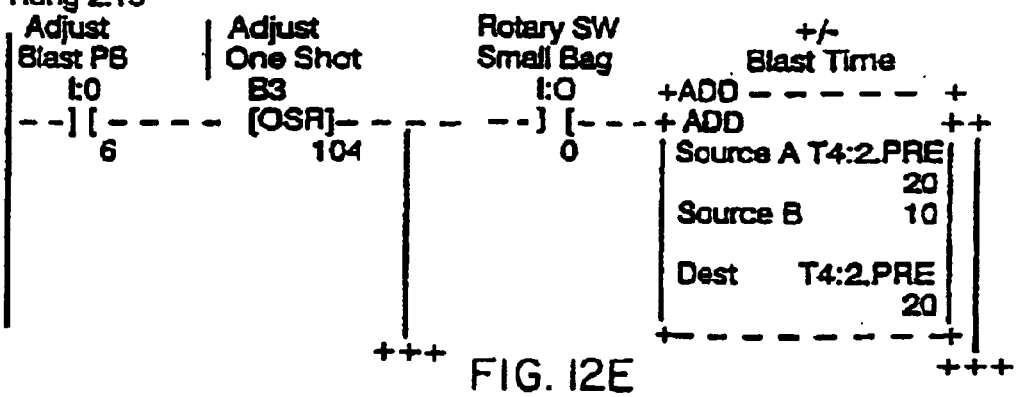
FIG. 12E

AIR ASSISTED COLLATOR PROGRAM LISTING
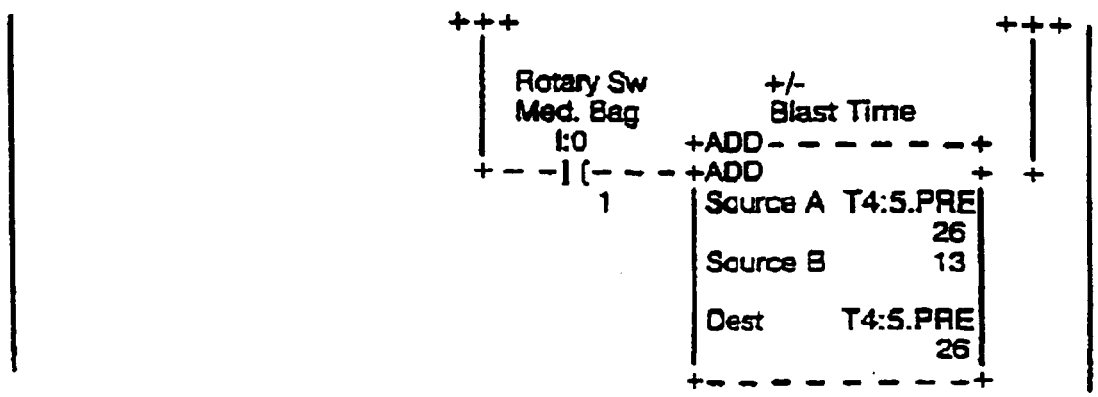
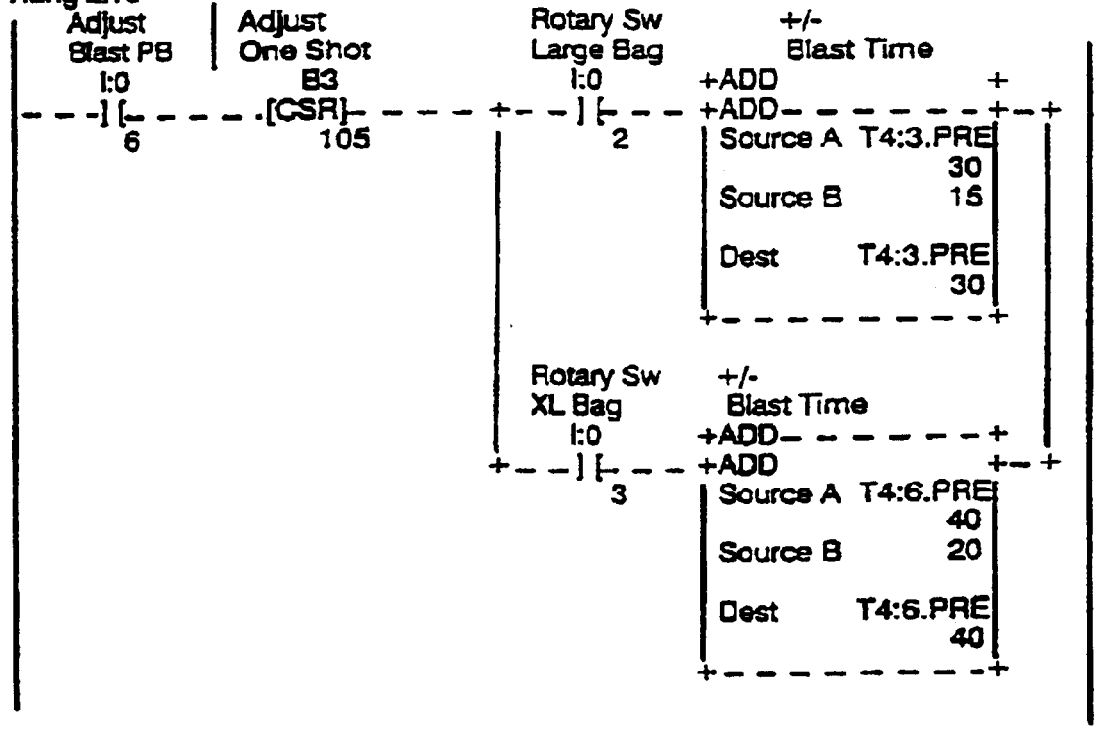
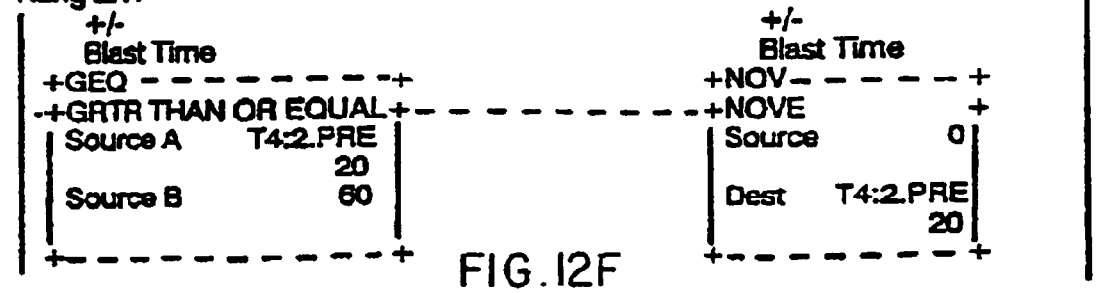
FIG. 12F

AIR ASSISTED COLLATOR PROGRAM LISTING

```
Rung 2:18
     +/-
    Blast Time                              +/-
                                           Blast Time
 +GEQ----------+                        +NOV------+
 +GRTR THAN OR EQUAL+--- ---+NOVE        +
   Source A    T4:5.PRE       Source         0
               26
   Source B    78              Dest    T4:5.PRE
                                              26
 +-------------+                        +---------+

Rung 2:19
     +/-
    Blast Time                              +/-
                                           Blast Time
 +GEQ----------+                        +NOV------+
 -+GRTR THAN OR EQUAL+--- ---+NOVE       +
   Source A    T4:3.PRE       Source         0
               30
   Source B    90              Dest    T4:3.PRE
                                              30
 +-------------+                        +---------+

Rung 2:20
     +/-
    Blast Time                              +/-
                                           Blast Time
 +GEQ----------+                        +NOV------+
 -+GRTR THAN OR EQUAL+--- ---+NOVE       +
   Source A    T4:6.PRE       Source         0
               40
   Source B    120             Dest    T4:6.PRE
                                              40
 +-------------+                        +---------+

Rung 2:21

+----------------+END+------------+
```

FIG. 12G

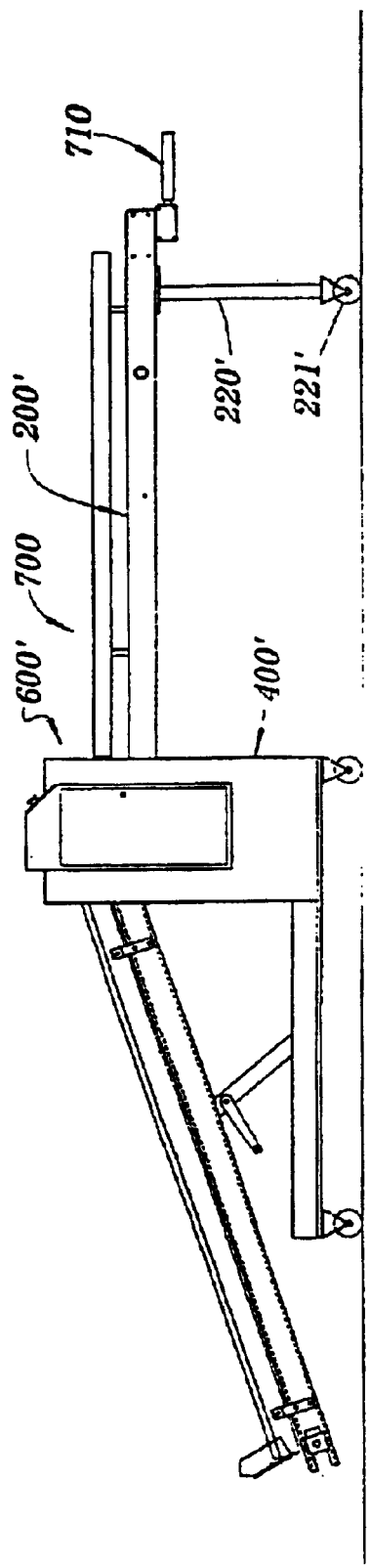
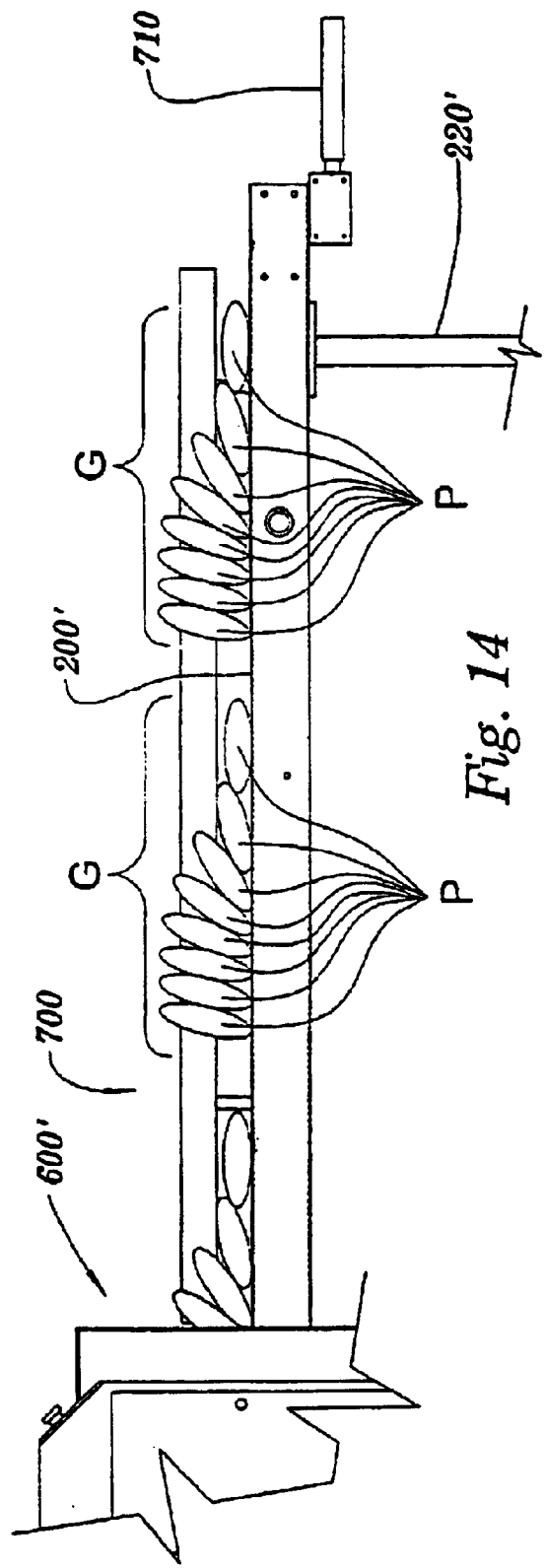
Fig. 13
Fig. 14

RUNG 2:0 - START/STOP CONTROL.
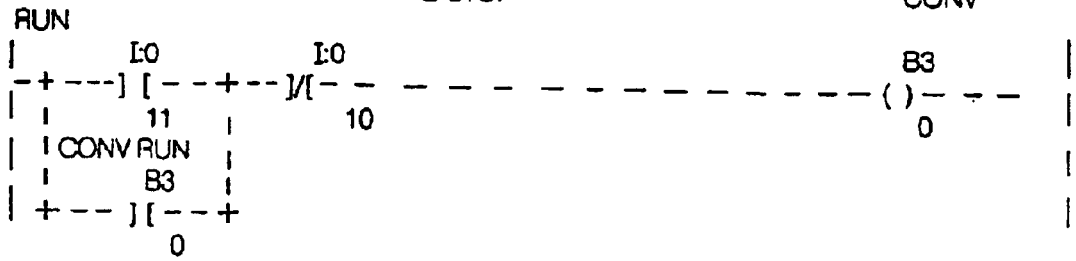
RUNG 2:1 AND 2:2 - INDEXING CONTROLS.
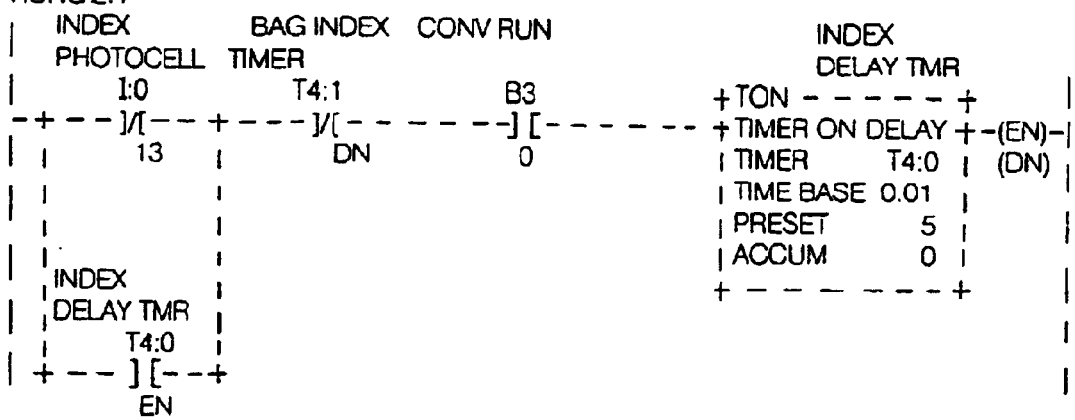
RUNGS 2:3 THRU 2:5-AIR BLAST TIMER CONTROLS.
RUNG 2:3
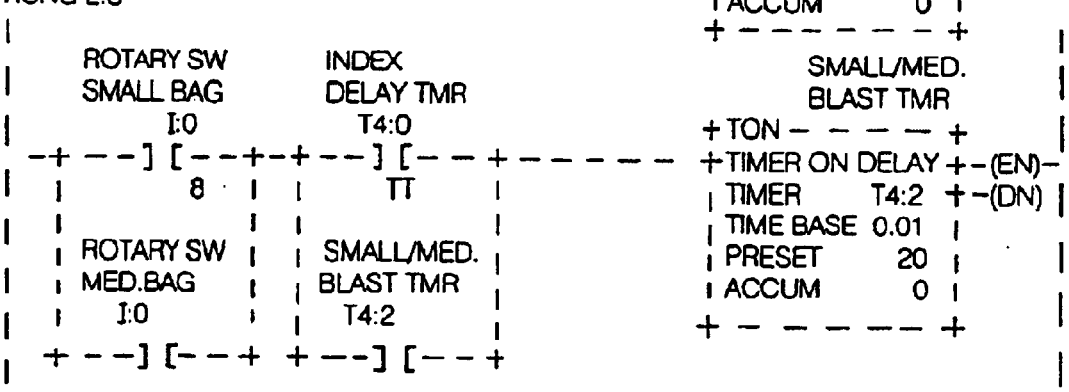
FIG.16A

```
RUNGS 2:4
  ROTARY SW      INDEX                              LARGE BAG
  LARGE BAG      DELAY TMR                          BLAST TMR
     I:0           T4:0                         + TON - - - - - +
 ---] [---+---] [---+---------+ TIMER ON DELAY +-(EN)-
      6        TT                              | TIMER      T4:3+-(DN)
                                               | TIME BASE  0.01
                                               | PRESET       0
                                               | ACCUM        0
                                               +-------+
                    LARGE BAG
                    BLAST TMR
                      T4:3
               +---]/[-----+
RUNG 2:5              TT
  ROTARY SW     INDEX                               XL BAG
  XL BAG        DELAY TMR                           BLAST TMR
    I:0           T4:0                          + TON - - - - - +
 ---] [---+---] [----+---------+ TIMER ON DELAY +-(EN)-
      5        TT                              | TIMER      T4:4+-(DN)
                                               | TIME BASE  0.01
                                               | PRESET       0
                                               | ACCUM        0
                                               +-------+
                    XL BAG
                    BLAST TMR
                      T4:4
               +---] [-----+
                    TT
```

RUNGS 2:6 THRU 2:9-INDEX DELAY AND BAG INDEX TIMER ADJUSTMENT CONTROLS.
RUNG 2:6

```
  ROTARY SW   | SMALL BAG                          ADJ INDEX
  SMALL BAG   | ONE SHOT                           DELAY TMR
    I:0           B3                           + MOV - - - - +
 ---] [-------[OSR]-----------+-+ MOVE         +-+-
      8           100         | | SOURCE      5
                              | | DEST   T4:0.PRE
                              |                   5
                              |               +-------+
                              |                  ADJ BAG
                              |                  INDEX TMR
                              |               + MOV - - - - +
                              +-+ MOVE        +-+
                                | SOURCE     25
                                | DEST   T4:1.PRE
                                                 25
                                              +-------+
```

FIG. 16B

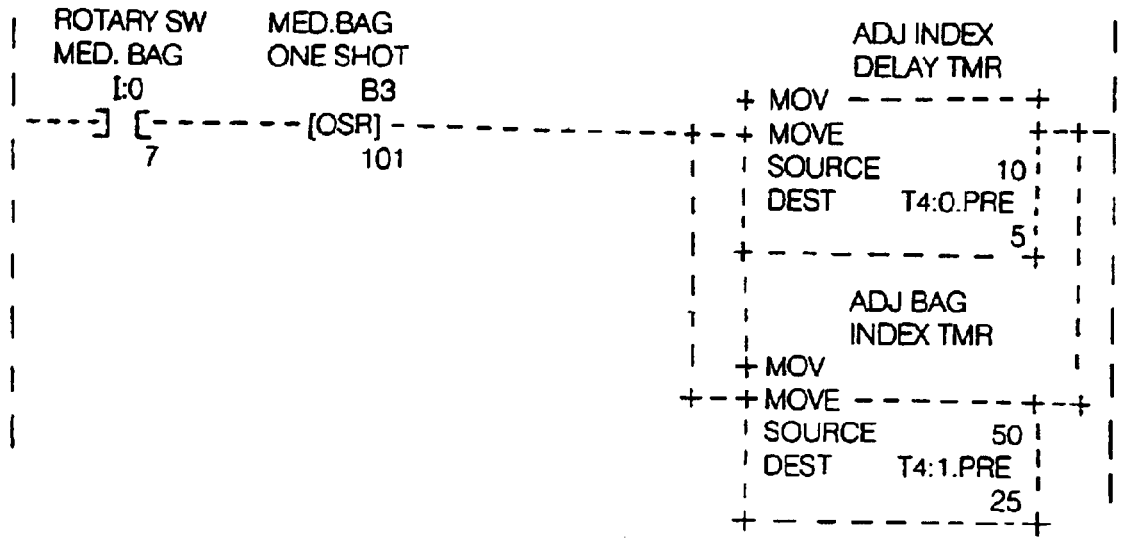
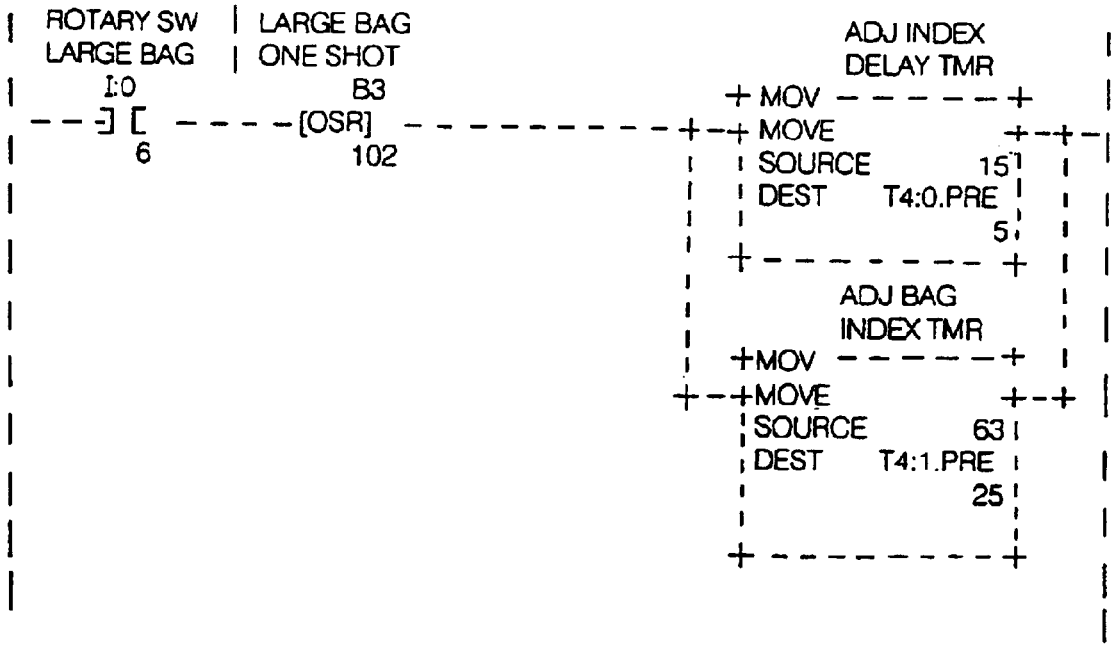
FIG. 16C

RUNGS 2:6 THRU 2:9-INDEX DELAY AND BAG INDEX TIMER ADJUSTMENT CONTROLS.
  RUNG 2:9
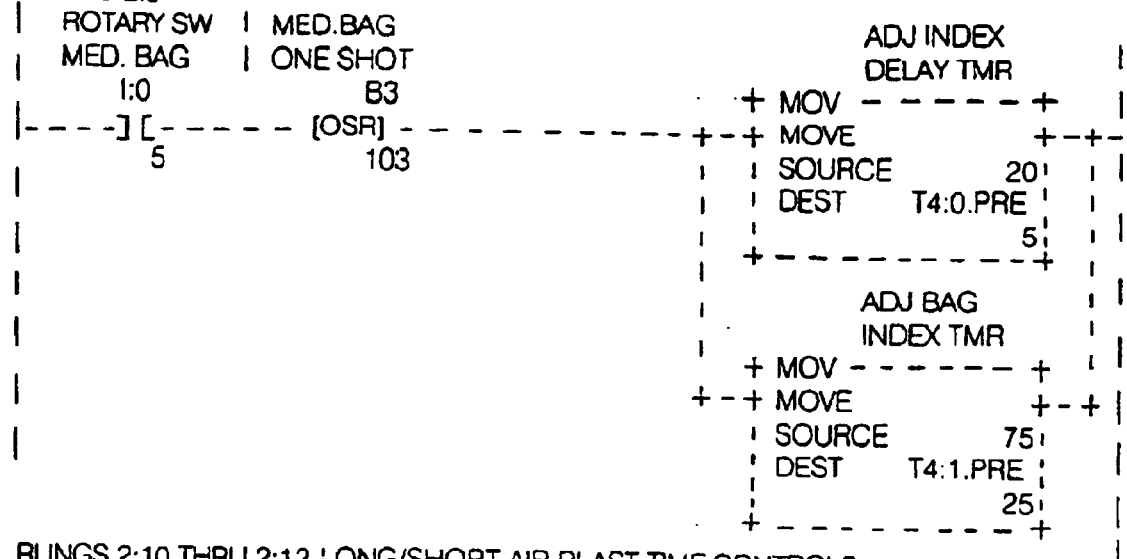
RUNGS 2:10 THRU 2:12-LONG/SHORT AIR BLAST TIME CONTROLS.
  RUNG 2:10
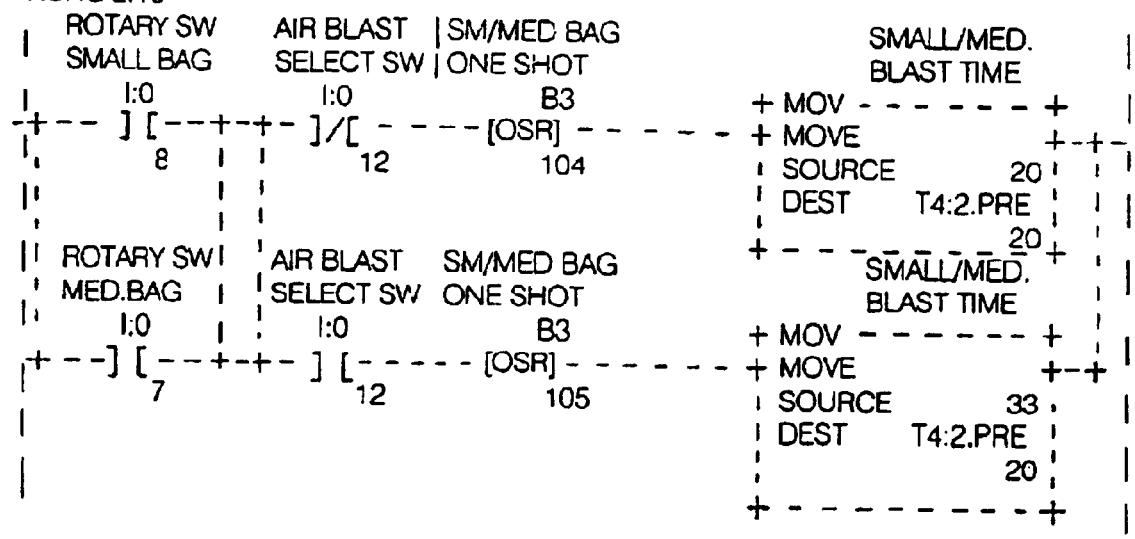
FIG. 16D

```
RUNGS 2:11
   ROTARY SW         AIR BLAST    LARGE BAG                LARGE BAG
   LARGE BAG         SELECT SW    ONE SHOT                 BLAST TIME
     I:0               I:0           B3           + MOV - - - - - - +
   ---] [----------+---]/[-------[OSR]---  + MOVE              +-+-
      6            |     12          106    | SOURCE      33 |  |
                   |                         | DEST    T4:3.PRE |  |
                   |                         |              0 |  |
                   |                         + - - - - - - - +
                   |  AIR BLAST    LARGE BAG                LARGE BAG
                   |  SELECT SW    ONE SHOT                 BLAST TIME
                   |    I:0           B3           + MOV - - - - - - +
                   +---] [--------[OSR]---  + MOVE              +-+
                        12          107    | SOURCE      50 |
                                            | DEST    T4:3.PRE |
                                            |              0 |
                                            + - - - - - - - +
RUNG 2:12
   ROTARY SW         AIR BLAST    XL BAG                   XL BAG
   XL BAG            SELECT SW    ONE SHOT                 BLAST TIME
     I:0               I:0           B3           + MOV - - - - - +
   ---] [----------+---]/[-------[OSR]---  + MOVE              +-+-
      5            |     12          108    | SOURCE      50 |  |
                   |                         | DEST    T4:4.PRE |  |
                   |                         |              0 |  |
                   |                         + - - - - - - - +
                   |  AIR BLAST    XL BAG                    XL BAG
                   |  SELECT SW    ONE SHOT                  BLAST TIME
                   |    I:0           B3           + MOV - - - - - +
                   +---] [--------[OSR]---  + MOVE              +-+
                        12          109    | SOURCE      75 |
                                            | DEST    T4:4.PRE |
                                            |              0 |
                                            + - - - - - - - +

RUNGS 2:13 AND 2:14 - AIR BLAST SOLENOID CONTROLS.
RUNG 2:13
   SMALL/MED.                                              LOW AIR
   BLAST TMR                                               BLAST SOL.
     T4:2                                                    O:0
   ---] [- - - - - - - - - - - - - - - - - - - - - - - -( )---
       TT                                                    1
```

FIG. 16E

```
RUNGS 2:14
    LARGE BAG                                              HIGH AIR
    BLAST TMR                                              BLAST SOL.
    T4:3                                                   O:0
+--] [---+------------------------------------( )---+
|        |
|   TT   |                                              2
|  XL BAG|
|  BLAST TMR
|  T4:4
+--] [---+
    TT
```

RUNGS 2:15 THRU 2:22 - DC MOTOR SPEED CONTROLS.

RUNG 2:15
```
    FULL/JOG BAG INDEX  PULLED GAP                        INDEXING
    SPEED    TIMER      SPEED                             SPEED
    O:0      T4:1       O:0                               O:0
----]/[-----] [-------]/[---------------------------( )----
    9        TT         10                                8
```

RUNG 2:16
```
    JOG PB'S                                              FULL/JOG
                                                          SPEED
    I:0                                                   O:0
-+--] [---+-----------------------------------------( )----
 |   9    |                                               9
 | ROTARY SW
 | CONTINUOUS
 |   I:0
 +--] [---+
     4
```

RUNG 2:17
```
    ROTARY SW  INDEXING   FULL/JOG   GAP TIMER           PULLED GAP
    SMALL BAG  SPEED      SPEED                          SPEED
    I:0        O:0        O:0        T4:5                O:0
-+--] [---+--]/[------]/[--------] [------------------( )----
 |   8    |  8          9           TT                  10
 | ROTARY SW
 | MED. BAG
 |   I:0
 +--] [---+
     7
 | ROTARY SW
 | LARGE BAG
 |   I:0
 +--] [---+
     6
 | ROTARY SW
 | XL BAG
 |   I:0
 +--] [---+
     5
```

FIG. 16F

```
RUNGS 2:18
   ROTARY SW    | SMALL BAG                              GAP TIMER
   SMALL BAG    | ONE SHOT
     I:0         |   B3                               +MOV --- --- +
  ---] [--- --- ---[OSR]--- --- --- --- --- --- ---  +MOVE        +-
      8             110                              | SOURCE   50 |
                                                     | DEST   T4:5.PRE |
                                                     |             50 |
                                                     +--- --- --- ---+

RUNG 2:19
   ROTARY SW    | MED.BAG                               GAP TIMER
   MED.BAG      | ONE SHOT
     I:0        |   B3                                +MOV --- --- +
  ---] [--- ---[OSR]--- --- --- --- --- --- ---      +MOVE        +-
      7             111                              | SOURCE   63 |
                                                     | DEST   T4:5.PRE |
                                                     |             50 |
                                                     +--- --- --- ---+

RUNG 2:20
   ROTARY SW    | LARGE BAG                              GAP TIMER
   LARGE BAG    | ONE SHOT
     I:0        |    B3                               +MOV --- --- +
  ---] [--- --- ---[OSR]--- --- --- --- --- --- ---  +MOVE        +-
      6             112                              | SOURCE   75 |
                                                     | DEST   T4:5.PRE |
                                                     |             50 |
                                                     +--- --- --- ---+

RUNG 2:21
   ROTARY SW    | XL BAG                                GAP TIMER
   XL BAG       | ONE SHOT
     I:0        |   B3                                +MOV --- --- +
  ---] [--- ---[OSR]--- --- --- --- --- --- ---      +MOVE        +-
      5             113                              | SOURCE   100 |
                                                     | DEST   T4:5.PRE |
                                                     |             50 |
                                                     +--- --- --- ---+

RUNG 2:22
       COUNTER                                          GAP TIMER
         C5:1                                        +TON             +
  |-+---] [---+--- --- --- --- --- --- ---          +TIMER ON DELAY +(EN)-
   |    DN    |                                     | TIMER    T4:5+(DN)
   |          |                                     | TIME BASE  0.01 |
   |          |                                     | PRESET       50 |
   |          |                                     | ACCUM         0 |
   |          |                                     +--- --- --- ---+
   |  GAP TIMER |
   |   T4:5    |
   | +---] [---+
         TT
```

FIG. 16G

RUNGS 2:23 THRU 2:28 - OPTIONAL LOOSE PACK CONTROLS.
RUNG 2:23
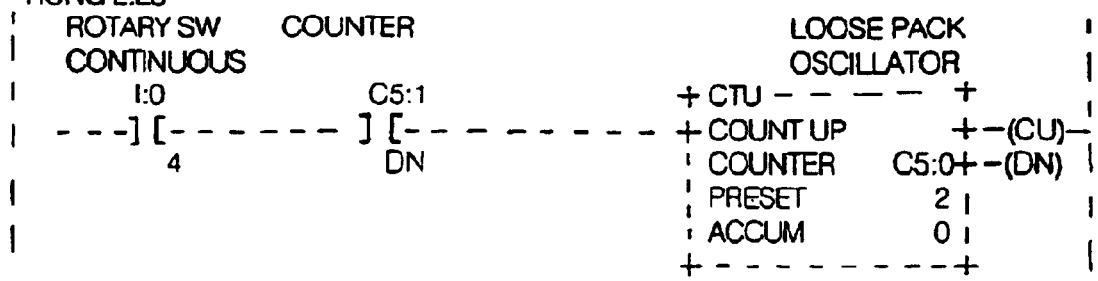
RUNG 2:24
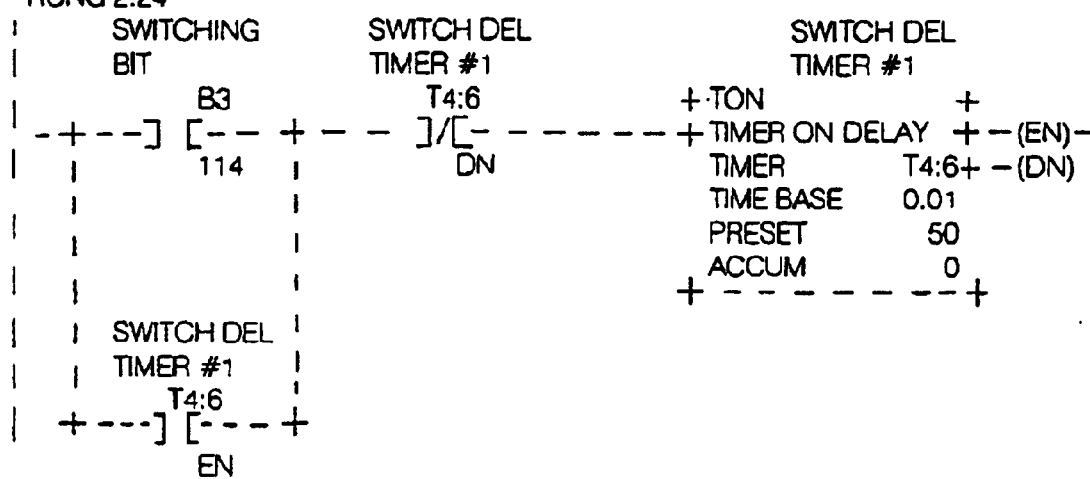
RUNG 2:25
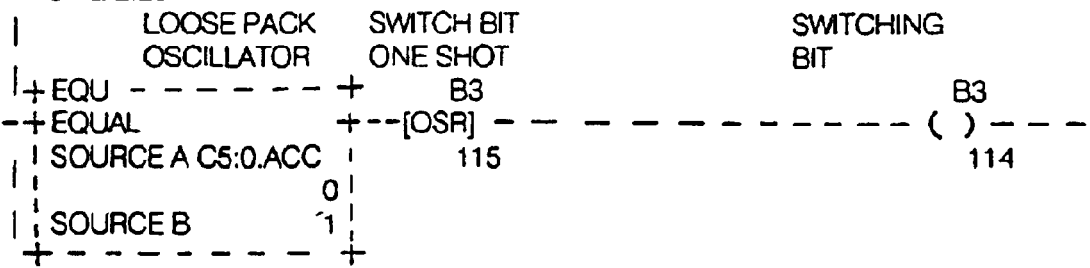
RUNG 2:26
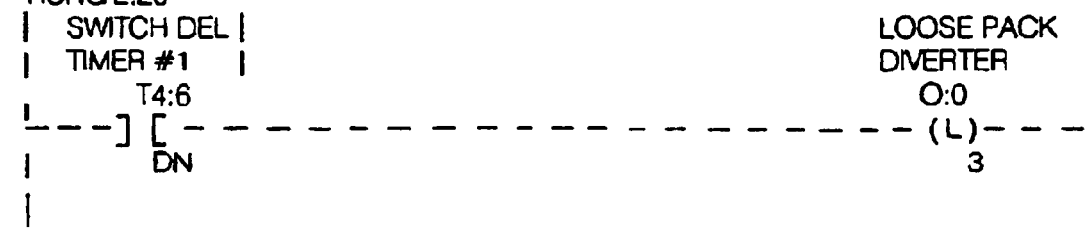
FIG. 16H

```
RUNGS 2:27
           LOOSE PACK              SWITCH DEL              LOOSE PACK
           OSCILLATOR              TIMER #2                OSCILLATOR
        + EQU - - - - - +          T4:7                  + MOV - - - - +
    -+- + EQUAL         +  - + -]/[- - - - - + -+ MOVE            +---+-
     |  | SOURCE A C5:0.ACC |    |   DN        |  | SOURCE       0 |    |
     |  |               0 |      |             |  |                |    |
     |  | SOURCE B      2 |      |             |  | DEST   C5:0.ACC |   |
     |  +- - - - - - - -+       |              |  +- - - - - - 0 +      |
     |                           |              |                        |
     |   SWITCH DEL              |              |    SWITCH DEL          |
     |   TIMER #2                |              |    TIMER #2            |
     |     T4:7                  |              |  + TON - - - - +       |
     +- - -] [- - - - - - - - - -+             +-+ TIMER ON DELAY +-(EN)-+
               EN                                 | TIMER     T4:7+-(DN)
                                                  | TIME BASE 0.01 |
                                                  | PRESET      50 |
                                                  | ACCUM        0 |
                                                  +- - - - - - +

RUNG 2:28
     SWITCH DEL |                                    LOOSE PACK
     TIMER #2   |                                    DIVERTER
       T4:7                                            O:0
    - - -] [- - - - - - - - - - - - - - - - - - - - - (U) - - -
         DN                                             3
RUNGS 2:29 THRU 2:32-STROBE CONTROLS. THE OUTPUTS WILL STROBE ONCE
WHENEVER THE START BUTTON IS PRESSED, OR WHEN THE COUNTER REACHES IT'S
COUNT. THIS WILL LOAD THE VALUE ON THE THUMBWHEEL SWITCHES INTO MEMORY.
RUNG 2:29
      START PB  | START PB |                          START
                | ONE SHOT |
        I:0         B3                                  B3
      - - -] [- - -[OSR]- - - - - - - - - - - - - - - ( ) - - -
         11         20                                  21
```

FIG. 161

RUNG 2:30
```
       START
        B3                                1'S COUNT
                                           TIMER
                                      +TON - - - - +
  +---] [---+--------------------+--+TIMER ON DELAY+--(EN)--+
  |    21   |                    |  +-+TIMER    T4:8+--(DN) |
  |         |                    |    |TIME BASE  0.01|     |
  |         |                    |    |PRESET       10|     |
  |         |                    |    |ACCUM         0|     |
  |         |                    |    +---------------+     |
  |  COUNTER|                    |                          |
  |    C5:1 |                    |      1'S COUNT           |
  +---] [---+                    |        O:0               |
  |    DN   |                    +-------( )----------------+
  |  1'S COUNT                            4
  |  TIMER  |
  |    T4:8 |
  +---] [---+
        TT
```
RUNG 2:31
```
     1'S COUNT
      TIMER                             10'S COUNT
       T4:8                              TIMER
                                      + TON - - - - - +
  +---] [---+--------------------+--+TIMER ON DELAY+--(EN)--+
  |         |                    |    |TIMER    T4:9+--(DN) |
  |         |                    |    |TIME BASE  0.01|     |
  |         |                    |    |PRESET       10|     |
  |         |                    |    |ACCUM         0|     |
  |         |                    |    +---------------+     |
  |  10'S COUNT                   |                          |
  |  TIMER  |                    |     10'S COUNT           |
  |    T4:9 |                    |       O:0                |
  +---] [---+                    +-------( )----------------+
        TT                               5
```
RUNG 2:32
```
     10'S COUNT
      TIMER                             100'S
       T4:9                             COUNT TMR
                                      +TON - - - - - +
  +---] [---+--------------------+--+TIMER ON DELAY +--(EN)--+
  |    DN   |                    |    |TIMER   T4:10+--(DN)  |
  |         |                    |    |TIME BASE  0.01|      |
  |         |                    |    |PRESET       10|      |
  |         |                    |    |ACCUM         0|      |
  |         |                    |    +---------------+      |
  |  100'S  |                    |                           |
  |  COUNT TMR                   |     100'S                 |
  |    T4:10|                    |     COUNT                 |
  +---] [---+                    |       O:0                 |
        TT                       +-------( )-----------------+
                                         6
```

FIG. 16J

RUNGS 2:33 THRU 2:42-NUMBER CONTROL FOR ALL THUMBWHEEL SWITCHES.
RUNG 2:33

```
     1'S STROBE   2'S STROBE   4'S STROBE   8'S STROBE              ZERO
     I:0          I:0          I:0          I:0                      B3
|---]/[---------]/[----------]/[---------]/[--------------------(   )---|
       0            1            2            3                       10
```

RUNG 2:34

```
     1'S STROBE   2'S STROBE   4'S STROBE   8'S STROBE              ONE
     I:0          I:0          I:0          I:0                      B3
|---] [---------]/[----------]/[---------]/[--------------------(   )---|
       0            1            2            3                       11
```

RUNG 2:35

```
     1'S STROBE   2'S STROBE   4'S STROBE   8'S STROBE              TWO
     I:0          I:0          I:0          I:0                      B3
|---]/[---------] [----------]/[---------]/[--------------------(   )---|
       0            1            2            3                       12
```

RUNG 2:36

```
     1'S STROBE   2'S STROBE   4'S STROBE   8'S STROBE              THREE
     I:0          I:0          I:0          I:0                      B3
|---] [---------] [----------]/[---------]/[--------------------(   )---|
       0            1            2            3                       13
```

RUNG 2:37

```
     1'S STROBE   2'S STROBE   4'S STROBE   8'S STROBE              FOUR
     I:0          I:0          I:0          I:0                      B3
|---]/[---------]/[----------] [---------]/[--------------------(   )---|
       0            1            2            3                       14
```

RUNG 2:38

```
     1'S STROBE   2'S STROBE   4'S STROBE   8'S STROBE              FIVE
     I:0          I:0          I:0          I:0                      B3
|---] [---------]/[----------] [---------]/[--------------------(   )---|
       0            1            2            3                       15
```

RUNG 2:39

```
     1'S STROBE   2'S STROBE   4'S STROBE   8'S STROBE              SIX
     I:0          I:0          I:0          I:0                      B3
|---]/[---------] [----------] [---------]/[--------------------(   )---|
       0            1            2            3                       16
```

RUNG 2:40

```
     1'S STROBE   2'S STROBE   4'S STROBE   8'S STROBE              SEVEN
     I:0          I:0          I:0          I:0                      B3
|---] [---------] [----------] [---------]/[--------------------(   )---|
       0            1            2            3                       17
```

RUNG 2:41

```
     1'S STROBE   2'S STROBE   4'S STROBE   8'S STROBE              EIGHT
     I:0          I:0          I:0          I:0                      B3
|---]/[---------]/[----------]/[---------] [--------------------(   )---|
       0            1            2            3                       18
```

FIG. 16K

```
RUNGS 2:42
|  1'S STROBE  2'S STROBE  4'S STROBE  8'S STROBE           NINE                |
|    I:0         I:0         I:0         I:0                 B3                 |
|---] [--------]/[--------]/[---------] [-----------------( )-------------------|
|     0           1           2           3                  19                 |
RUNGS 2:43 THRU 2:47-EVALUATE THUMBWHEEL SETTINGS AND LOAD VALUE INTO
N7:0.
RUNG 2:43
         1'S COUNT                    ZERO                 1'S PLACE
           O:0                         B3              +MOV--------+
    +----] [-----------------+----] [------------------+MOVE       +-+-+
    |       4                |     10                  | SOURCE   0 | | |
    |                        |                         | DEST    N7:1| | |
    |                        |                         |           3 | | |
    |                        |                         +------------+ | |
    |                        |      ONE                  1'S PLACE    | |
    |                        |       B3              +MOV--------+    | |
    |                        +----] [------------------+MOVE       +-+ |
    |                        |     11                  | SOURCE   1 | | |
    |                        |                         | DEST    N7:1| | |
    |                        |                         |           3 | | |
    |                        |                         +------------+ | |
    |                        |      TWO                  1'S PLACE    | |
    |                        |       B3              +MOV-----+       | |
    |                        +----] [------------------+MOVE       +-+ |
    |                        |     12                  | SOURCE   2 | | |
    |                        |                         | DEST    N7:1| | |
    |                        |                         |           3 | | |
    |                        |                         +------------+ | |
    |                        |     THREE                 1'S PLACE    | |
    |                        |       B3              +MOV----+        | |
    |                        +----] [------------------+MOVE       +-+ |
    |                        |     13                  | SOURCE   3 | | |
    |                        |                         | DEST    N7:1| | |
    |                        |                         |           3 | | |
    |                        |                         +------------+ | |
    |                        |     FOUR                  1'S PLACE    | |
    |                        |       B3              +MOV-------+     | |
    |                        +----] [------------------+MOVE       +-+ |
    |                        |     14                  | SOURCE   4 | | |
    |                        |                         | DEST    N7:1| | |
    |                        |                         |           3 | | |
    |                        |                         +------------+ | |
    |                        |     FIVE                  1'S PLACE    | |
    |                        |       B3              +MOV--------+    | |
    |                        +----] [------------------+MOVE       +-+ |
    |                        |     15                  | SOURCE   5 | | |
    |                        |                         | DEST    N7:1| | |
    |                        |                         |           3 | | |
    |                        |                         +------------+ | |
    FIG.16L                  +++                                      +++
```

```
                              +++                              +++
                              |
                              | SIX           1'S PLACE
                              |     B3      +MOV------+
                              +--] [---    +MOVE          +-+
                              |     16     | SOURCE     6|
                              |            | DEST     N7:1|
                              |            |             3|
                              |            +--------------+
                              | SEVEN         1'S PLACE
                              |     B3      +MOV------+
                              +--] [--     +MOVE          +-+
                              |     17     | SOURCE     7|
                              |            | DEST     N7:1|
                              |            |             3|
                              |            +--------------+
                              | EIGHT         1'S PLACE
                              |     B3      +MOV------+
                              +--] [---    +MOVE          +-+
                              |     18     | SOURCE     8|
                              |            | DEST     N7:1|
                              |            |             3|
                              |            +--------------+
                              | NINE          1'S PLACE
                              |     B3      +MOV------+
                              +--] [---    +MOVE          +-+
                              |     19     | SOURCE     9|
                              |            | DEST     N7:1|
                              |            |             3|
                              |            +--------------+
RUNG 2:44
    10'S COUNT   ZERO              10'S PLACE
       O:0        B3            +MOV------+
  ---][--+--] [--  +MOVE                    +-+
       5  |    10   | SOURCE     0|
          |         | DEST     N7:2|
          |         |             0|
          |         +--------------+
          |  ONE           10'S PLACE
          |   B3         +MOV------+
          +--] [---    +MOVE              +-+
              11       | SOURCE     1|
                       | DEST     N7:2|
                       |             0|
                       +--------------+

```
         +++++                           +++           +++
    |    |    |                          |  |          | |
    |    |  TWO         10'S PLACE       |  |          | |
    |    |      B3   +MOV - - - - - +    |  |          | |
    |    +----] [---+MOVE           +-+  |  |          | |
    |    |     12   | SOURCE      2 |    |  |          | |
    |    |          | DEST      N7:2|    |  |          | |
    |    |          |               0|   |  |          | |
    |    |          +- - - - - - - -+    |  |          | |
    |    |  THREE       10'S PLACE       |  |          | |
    |    |      B3   +MOV - - - - - +    |  |          | |
    |    +----] [---+MOVE           +-+  |  |          | |
    |    |     13   | SOURCE      3 |    |  |          | |
    |    |          | DEST      N7:2|    |  |          | |
    |    |          |               0|   |  |          | |
    |    |          +- - - - - - - -+    |  |          | |
    |    |  FOUR        10'S PLACE       |  |          | |
    |    |      B3   +MOV - - - - - +    |  |          | |
    |    +----] [---+MOVE           +-+  |  |          | |
    |    |     14   | SOURCE      4 |    |  |          | |
    |    |          | DEST      N7:2|    |  |          | |
    |    |          |               0|   |  |          | |
    |    |          +- - - - - - - -+    |  |          | |
    |    |  FIVE        10'S PLACE       |  |          | |
    |    |      B3   +MOV - - - - - +    |  |          | |
    |    +----] [---+MOVE           +-+  |  |          | |
    |    |     15   | SOURCE      5 |    |  |          | |
    |    |          | DEST      N7:2|    |  |          | |
    |    |          |               0|   |  |          | |
    |    |          +- - - - - - - -+    |  |          | |
    |    |  SIX         10'S PLACE       |  |          | |
    |    |      B3   +MOV - - - - - +    |  |          | |
    |    +----] [---+MOVE           +-+  |  |          | |
    |    |     16   | SOURCE      6 |    |  |          | |
    |    |          | DEST      N7:2|    |  |          | |
    |    |          |               0|   |  |          | |
    |    |          +- - - - - - - -+    |  |          | |
    |    |  SEVEN       10'S PLACE       |  |          | |
    |    |      B3   +MOV - - - - - +    |  |          | |
    |    +----] [---+MOVE           +-+  |  |          | |
    |    |     17   | SOURCE      7 |    |  |          | |
    |    |          | DEST      N7:2|    |  |          | |
    |    |          |               0|   |  |          | |
    |    |          +- - - - - - - -+    |  |          | |
    +++++                                 +++          +++
```

FIG. 16N

```
         ++++++                        +++                        +++
         |    |    EIGHT       10'S PLACE                   |    |  |   |
         |    |         B3   +MOV ------+-+                 |    |  |   |
         |    +--] [--  +MOVE           | |                 |    |  |   |
         |         18   |SOURCE       8 | |                 |    |  |   |
         |              |DEST       N7:2| |                 |    |  |   |
         |              |              0| |                 |    |  |   |
         |              +----------+    | |                 |    |  |   |
         |    |    NINE        10'S PLACE                   |    |  |   |
         |    |         B3   +MOV -----+                    |    |  |   |
         |    +-- ] [-- +MOVE          +-+                  |    |  |   |
         |         19   |SOURCE       9 |                   |    |  |   |
         |              |DEST       N7:2|                   |    |  |   |
         |              |              0|                   |    |  |   |
         |              +----------+                        |    |  |   |
         |                                           MULTIPLY    |  |   |
         |                                              BY 10    |  |
         |                                       +MUL ------+    |  |
         +-----------------------------------+MULTIPLY      +--+ |
         |                                    |SOURCE A   10 |   |
         |                                    |SOURCE B  N7:2|   |
         |                                    |              0|   |
         |                                    |DEST       N7:3|   |
         |                                    |              0|   |
         |                                    +---------+         |
RUNG 2:45
         100'S       ZERO        100'S
      |  COUNT                   PLACE
      |   0:0         B3       +MOV ---- +
      |--] [-+--+-] [---       +MOVE      +-+---------+
          6  |  |  10          |SOURCE    0| |         |   |
             |  |              |DEST    N7:4| |         |   |
             |  |              |           0| |         |   |
             |  |              +------+      |         |   |
             |  | ONE             100'S                |   |
             |  |                 PLACE                |   |
             |  |       B3     +MOV ----+              |   |
             |  +-] [--        +MOVE    +-+            |   |
             |       11        |SOURCE  1 |            |   |
             |                 |DEST   N7:4|           |   |
             |                 |          0|           |   |
             |                 +------+                |   |
             |                                         |   |
         +++++                       +++              +++
```

FIG. 160

```
         + ++ ++                           + ++         +++
  I      I  I                              I I I        I I I
  I      I  | TWO         100'S            I I I        I I I
  I      I  I             PLACE            I I I        I I I
  I      I  I       B3  +MOV - - - - - +   I I I        I I I
  I      I  +- - -] [- +MOVE           +-+ I I I        I I I
  I      I  I      12  I SOURCE      2 I I I I I        I I I
  I      I  I          I DEST     N7:4 I I I I I        I I I
  I      I  I          I             0 I I I I I        I I I
  I      I  I          +- - - - - - -+   I I I          I I I
  I      I  I THREE       100'S            I I I        I I I
  I      I  I             PLACE            I I I        I I I
  I      I  I       B3  +MOV - - - - - +   I I I        I I I
  I      I  +- -] [- -+MOVE            +-+ I I I        I I I
  I      I  I      13  I SOURCE      3 I I I I I        I I I
  I      I  I          I DEST     N7:4 I I I I I        I I I
  I      I  I          I             0 I I I I I        I I I
  I      I  I          +- - - - - - -+   I I I          I I I
  I      I  I FOUR        100'S            I I I        I I I
  I      I  I             PLACE            I I I        I I I
  I      I  I       B3  +MOV - - - - - +   I I I        I I I
  I      I  +- -] [- -+MOVE            +-+ I I I        I I I
  I      I  I      14  I SOURCE      4 I I I I I        I I I
  I      I  I          I DEST     N7:4 I I I I I        I I I
  I      I  I          I             0 I I I I I        I I I
  I      I  I          +- - - - - - -+   I I I          I I I
  I      I  I FIVE        100'S            I I I        I I I
  I      I  I             PLACE            I I I        I I I
  I      I  I       B3  +MOV - - - - - +   I I I        I I I
  I      I  +- -] [- -+MOVE            +-+ I I I        I I I
  I      I  I      15  I SOURCE      5 I I I I I        I I I
  I      I  I          I DEST     N7:4 I I I I I        I I I
  I      I  I          I             0 I I I I I        I I I
  I      I  I          +- - - - - - -+   I I I          I I I
  I      I  I SIX         100'S            I I I        I I I
  I      I  I             PLACE            I I I        I I I
  I      I  I       B3  +MOV - - - - - +   I I I        I I I
  I      I  +- -] [- -+MOVE            +-+ I I I        I I I
  I      I  I      16  I SOURCE      6 I I I I I        I I I
  I      I  I          I DEST     N7:4 I I I I I        I I I
  I      I  I          I             0 I I I I I        I I I
  I      I  I          +- - - - - - -+   I I I          I I I
  I      I  I SEVEN       100'S            I I I        I I I
  I      I  I             PLACE            I I I        I I I
  I      I  I       B3  +MOV - - - - - +   I I I        I I I
  I      I  +- - -] [- -+MOVE           +-+ I I I       I I I
  I      I  I      17  I SOURCE      7 I I I I I        I I I
  I      I  I          I DEST     N7:4 I I I I I        I I I
  I      I  I          I             0 I I I I I        I I I
  I      I  I          +- - - - - - -+   I I I          I I I
         ++++              FIG.16P        +++           +++
```

```
                  EIGHT           100'S
                                  PLACE
                      B3   +MOV — — — — — +
                   +--] [--+MOVE          +-+
                      18   | SOURCE      8 |
                           | DEST      N7:4|
                           |              0|
                           +— — — — — — — —+

NINE           100'S
                                  PLACE
                      B3   +MOV — — — — — +
                   +---] [--+MOVE          +-+
                      19   | SOURCE      9 |
                           | DEST      N7:4|
                           |              0|
                           +— — — — — — — —+

MULTIPLY
                                         BY 100
                                       +MUL
   +— — — — — — — — — — — — — — — — — —+MULTIPLY         +-+
                                       | SOURCE A   100 |
                                       | SOURCE B   N7:4|
                                       | DEST       N7:5|
                                       |              0 |
                                       +— — — — — — — — +

RUNG 2:46
   100'S                                   ADD 1'S
   COUNT TMR                                AND 10'S
     T4:10                              +ADD — — — — — +
 ---] [— — — — — — — — — — — — — — — — +ADD            +-+
     DN                                 | SOURCE A  N7:1|
                                        |              3|
                                        | SOURCE B  N7:3|
                                        |              0|
                                        | DEST      N7:6|
                                        |              3|
                                        +— — — — — — — —+
```

FIG. 16Q

```
RUNG 2:47
  100'S                                          ADD TOTAL
  COUNT TMR                                      TO 100'S
   T4:10                                       +ADD--------+
---] [------------------+--+ADD              +-+
    DN                    | | SOURCE A    N7:6 |
                          |              3 |
                          | | SOURCE B    N7:4 |
                          |              0 |
                          | | DEST        N7:0 |
RUNGS 2:48 THRU 2:50 COUNTER CONTROLS. |      3 |
THE COUNTER IS RESET EVERY TIME IT     +---------+
REACHES IT'S COUNT, AND RELOADS THE   +MOV--------+
THUMBWHEEL VALUE. THIS HAPPENS ALSO  +-+MOVE      +-+
WHEN THE START BUTTON IS PRESSED.      | SOURCE   N7:0 |
RUNG 2:48                              | DEST   C5:1.PRE |
                                       |              3 |
                                       +---------------+
       ADD TOTAL
       TO 100'S                          COUNT SET AT ZERO
     +EQ---------+                            B3
---+EQUAL        +------------------------( )----------
   | SOURCE A  N7:0 |
   |            3 |                           1
   | SOURCE B    0 |
   +-------------+
RUNG 2:49
     COUNTER                              COUNTER
      C5:1                                 C5:1
-+---] [--+------------------------------(RES)--------
 |   DN  |
 | START PB |
 |   I:0  |
 +---] [--+
    11
RUNG 2:50
 INDEX     ROTARY SW  COUNT SET  CONV RUN  COUNTER    COUNTER
 PHOTOCELL CONTINUOUS AT ZERO                ONE SHOT
  I:0        I:0        B3         B3        B3   +CTU-------+
-+--]/[-----]/[-----+--]/[-----] [--[OSR]-+COUNT UP    +-(CU)-
 |   13       4     |   1         0   116 | COUNTER C5:1+-(DN)
 |                  |                     | PRESET      3 |
 |                  |                     | ACCUM       0 |
 | LOOSE PACK|ROTARY SW |                  +------------+
 | PHOTOCELL |CONTINUOUS |
 |   I:0        I:0     |
 +--]/[--------] [-----+
    14            4
```

FIG.16R

RUNG 2:51-CONTROLS THE SELECTION OF VFD SPEED PRESETS. THE VFD WILL RUN AT SPEED PRESET #1 WHEN OUTPUT 7 IS LOW. SPEED PRESET #2 IS FOR SMALL BAGS. IF CONTINUOUS BAGS IS SELECTED, THE VFD WILL RUN AT A THIRD PRESET SPEED.

```
RUNG 2:51
  | ROTARY SW |                                    SPEED       |
  | SMALL BAG |                                    PRESETS     |
  |    I:0                                         O:0         |
  |---] [- - - - - - - - - - - - - - - - - - - -  -( )- - -   |
  |      8                                          7          |
RUNG 2:52
  |                                                            |
  |- - - - - - - - - - + END + - - - - - - - - -              |
  |                                                            |
  |                                                            |
```

FIG.16S

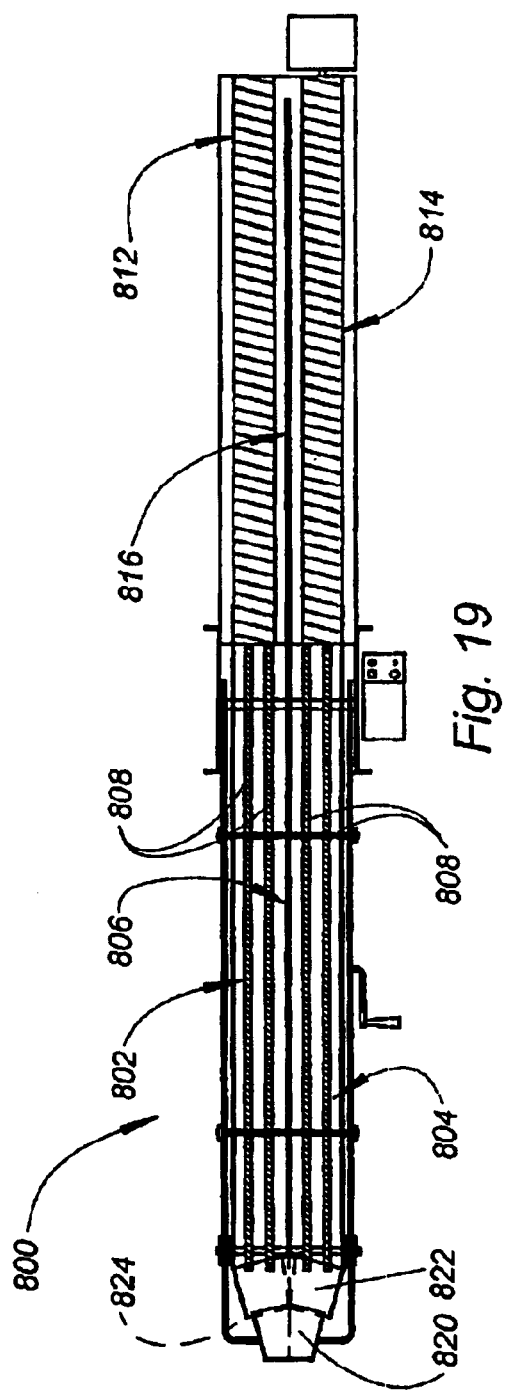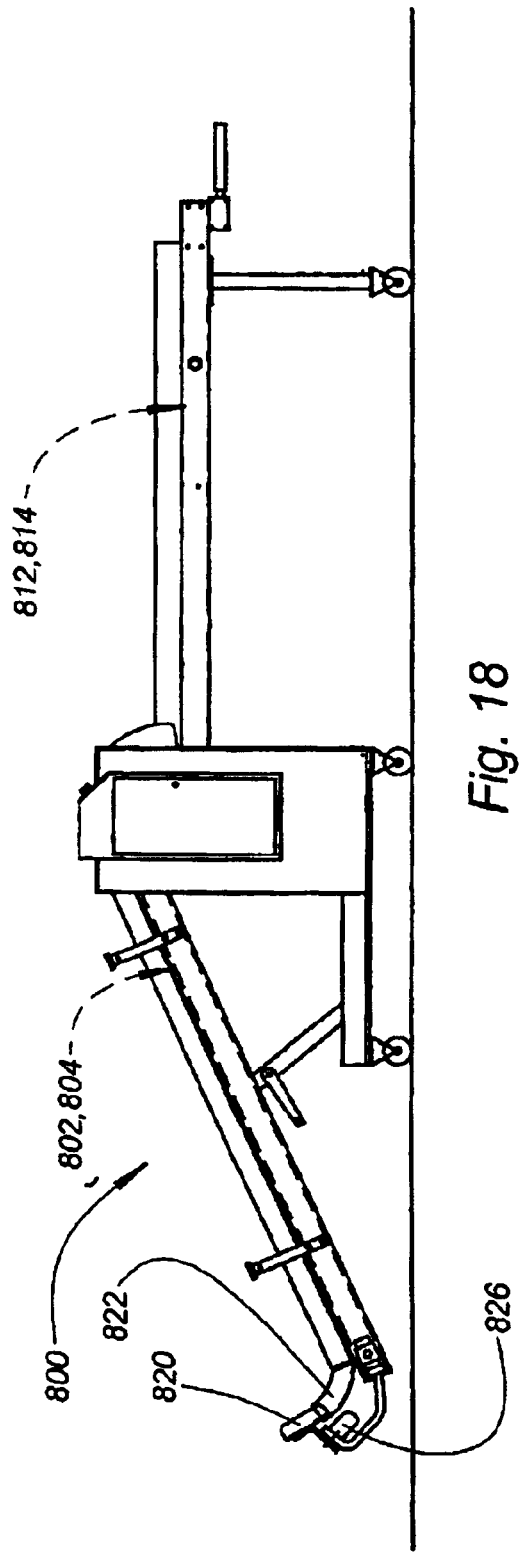

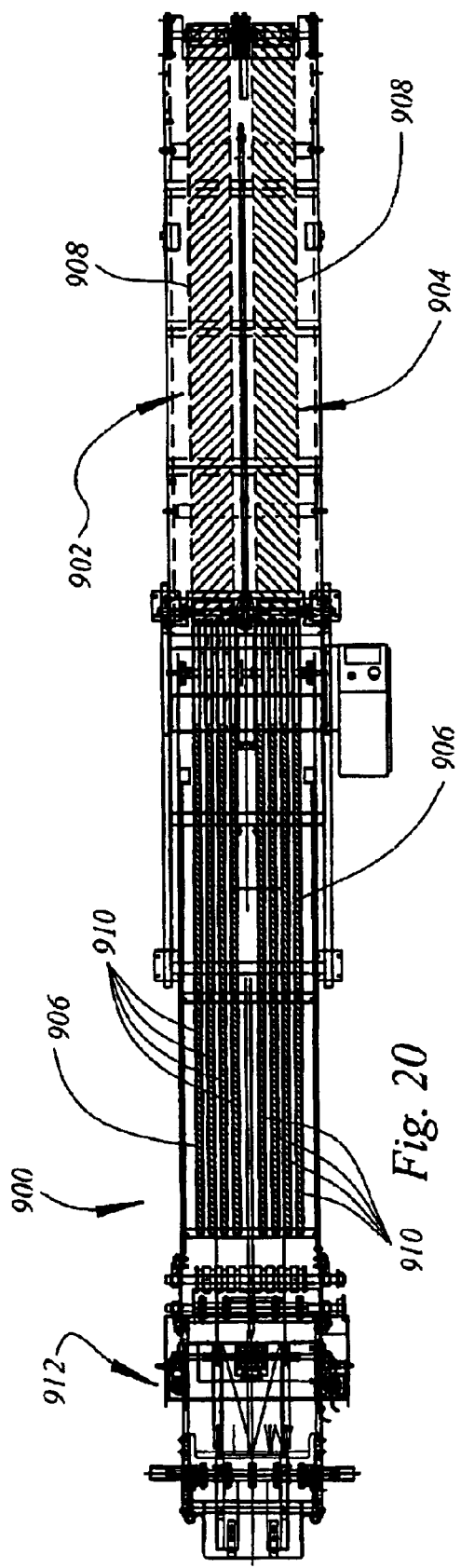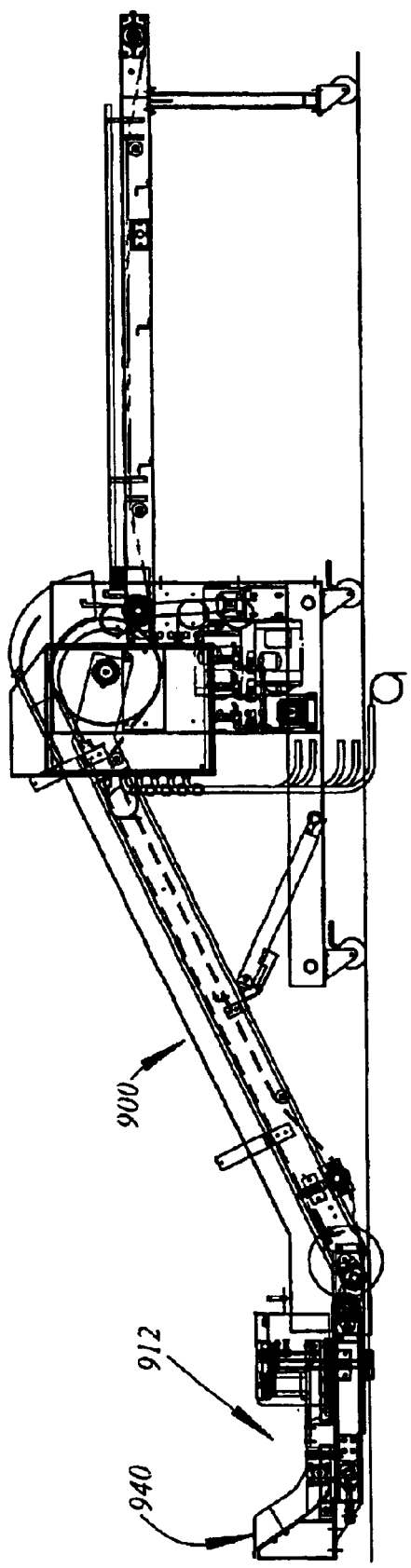
Fig. 20
Fig. 21

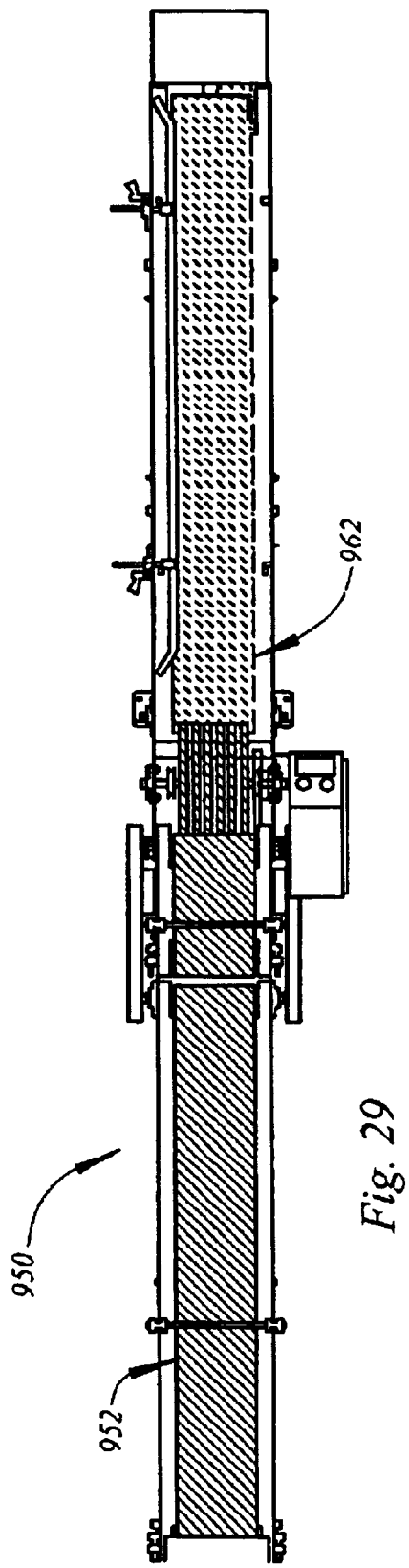
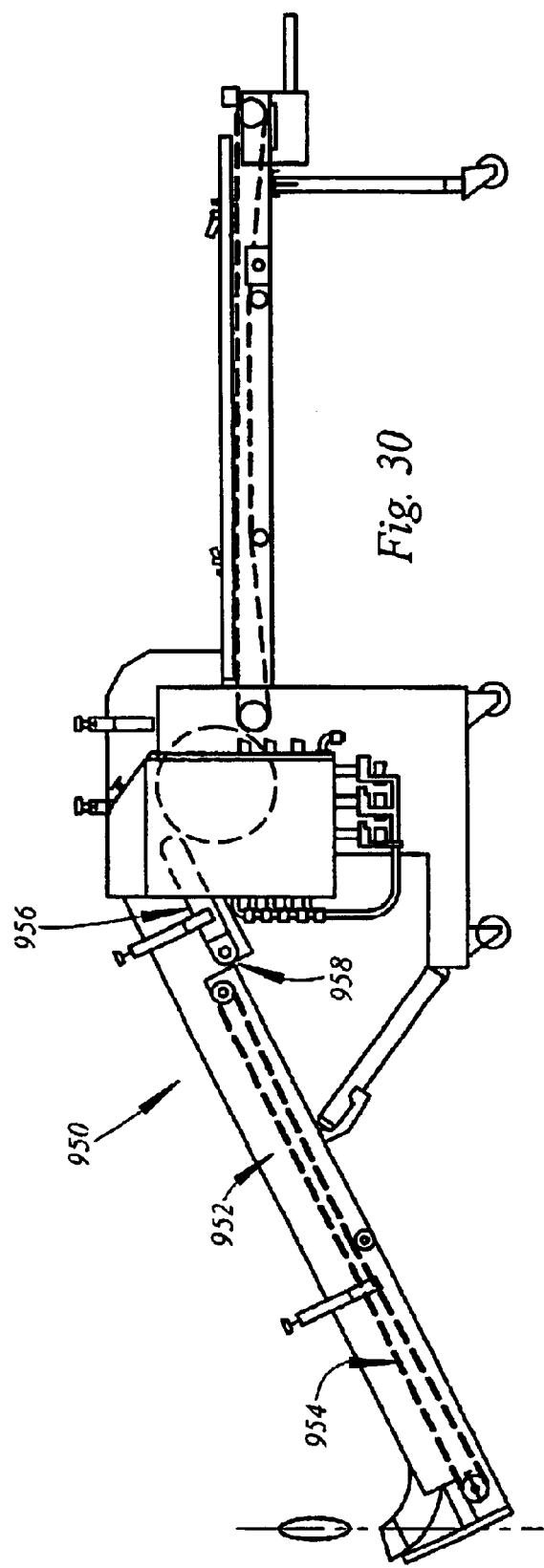

DIVERTER FOR DUAL TRACK AIR ASSISTED COLLATOR

CROSS-REFERENCES TO RELATED APPLICATIONS

This application is a continuation application of application Ser. No. 10/087,008 filed Mar. 4, 2002, now U.S. Pat. No. 6,688,455, which is a continuation-in-part of application Ser. No. 09/617,303 filed Jul. 17, 2000, now U.S. Pat. No. 6,382,391, which is a continuation-in-part of application Ser. No. 09/361,549, filed Jul. 27, 1999, now U.S. Pat. No. 6,244,018, which is a continuation-in-part of application Ser. No. 08/883,843 filed Jun. 27, 1997, now U.S. Pat. No. 5,941,365.

TECHNICAL FIELD

The present invention generally relates to an apparatus for positioning bagged food products on a conveyor and in particular to a conveyor apparatus for collating bagged food products and thereby aiding in the transfer of the bagged food products into shipping cartons.

BACKGROUND AND SUMMARY OF THE INVENTION

Food processing operations typically package products such as potato chips, corn chips, pretzels, etc., in product bags of various sizes ranging from individual serving portions to commercial establishment multiple serving-sized portions. In the art, small bags are typically 4 to 6 inches in height, medium bags 6 to 10 inches in height, large bags 10 to 13 inches in height, and extra large bags 13 to 18 inches in height. The product bags vary in width within each size range depending on the density of the product contained therein. For example, corn chips are more dense than potato chips and pretzels are more dense than corn chips, therefore product bags containing potato chips are wider that those containing corn chips, which in turn are wider than those containing pretzels.

In order to expedite the packaging of individually bagged food products such as potato chips, corn chips, pretzels, etc., into shipping cartons, it is desirable to have the bagged food products in a vertically oriented array. Vertical orienting of bagged food products, known in the art as collating, allows for efficient transition of the bagged food product into shipping cartons. Formerly, the process of gathering the bagged food products from conveyors and transferring them into shipping cartons was a tedious and time consuming labor intensive task. The bagged food products were randomly spaced and horizontally positioned on the conveyor making it difficult to transfer the individually bagged food products from the conveyor into the shipping cartons.

U.S. Pat. No. 4,356,906 issued Nov. 2, 1982 to David M. Fallas, discloses a prior art collator that advanced the art and assisted in gathering and arranging food product bags on a conveyor for transport into shipping cartons. U.S. Pat. Nos. 5,495,932 and 5,615,762, both issued to William B. Dyess and assigned to the Assignee of the present application disclose a conveyor apparatus for collating bag products that uses a bar to engage the packaged food products as they fall from the end of a first inclined conveyor onto a second horizontal conveyor. The bar has a friction enhancing surface covering which aids in pivoting the bagged food products as they fall, thereby properly collating the array of bagged food products. In the aforementioned Dyess collator, the position of the product engaging bar is manually adjustable.

Other prior art collators are known in the industry. One such collator includes a first conveyor having a rotatable discharge drum positioned at the end of an inclined conveyor and comprising a plurality of rotating disks. An air nozzle is adjustably positioned between the rotating disks of the drum. As a bagged food product is discharged over the rotating discharge drum of the inclined conveyor, a blast of air is ejected from the nozzle which strikes the falling product bag and assists in uprighting the bag on a receiving conveyor positioned below the discharge drum of the inclined conveyor. In the prior art collator, the air nozzle must be manually adjusted up or down to properly position the air blast relative to bags of varying product heights. Additionally, the pressure of the air blast must be adjusted manually to take into account the density of the product in the bag.

A need exists for a collator having pre-programmable adjustments based on product bag size and product density thereby eliminating the need for manual adjustment of the collating apparatus. A further need exists for a collating apparatus wherein the operator may adjust the operation of the collator while the collator is in operation (i.e., "on the fly").

The present invention includes a discharge conveyor having a rotatable drum positioned at its discharge end. The rotatable drum is comprised of a plurality of disks. Two pairs of air nozzles are positioned between the rotating disks of the rotatable drum. A receiving conveyor is positioned below the discharge end of the first conveyor. Bagged food products move along the discharge conveyor and are discharged over the rotating drum thereof. As each product bag falls toward the receiving conveyor, air blasts assist in uprighting, i.e., collating the product bag. A sensor indicates when the product bag is properly positioned to receive the air blasts for uprighting the bag. The present invention further includes a programmable logic controller ("PLC") which controls the speed and incremental movement of the conveyors, as well as the air pressure and the air blast duration required to effect collating.

A second embodiment of the invention includes a counter which records the number of bags moving through the collator. The counter can be used to activate the receiving conveyor to effect spacing between groups of bags. Alternatively, the counter can be used to activate a diverter mounted at the discharge end of the receiving conveyor which directs a preselected number of bags into each of a plurality of cartons.

A third embodiment of the invention comprises parallel discharge conveyors which deliver bagged food products to parallel receiving conveyors. Receiving chutes selectively direct incoming bagged food products to one or the other of the discharge conveyors.

A fourth embodiment of the invention comprises a diverter for receiving bagged food products and for selectively directing the received bagged food products to either of two spaced, parallel discharge conveyors. The diverter may also be used to position larger sized bagged food products centrally relative to the discharge conveyors.

BRIEF DESCRIPTION OF THE DRAWINGS

A more complete understanding of the present invention may be had by reference to the following Detailed Description when taken in connection with the accompanying Drawings wherein:

FIG. 3 is a side view of the collator of the first embodiment of the present invention;

FIG. 4 is a top view of the collator of FIG. 3;

FIG. 5 is a sectional side view of the collator of FIG. 4 taken along section line 5—5;

FIG. 6A is a partial section view taken along section line 6A—6A of FIGS. 3 and 4, illustrating the discharge drum of the collator of the present invention;

FIG. 6B is a section view taken along section line 6B—6B of FIGS. 3 and 4;

FIGS. 7A, 7B, 7C, and 7D are respective side and end views of rotatable disk members of the rotatable discharge drum of FIG. 6;

FIGS. 8A and 8B are side views of air discharge nozzles of the present invention;

FIG. 9 is a perspective view of the control panel of the programmable logic controller for the collator of the first embodiment of the present invention;

FIGS. 12A through 12G are a program listing of the control program for the Programmable Logic Controller (PLC) of the collator of the first embodiment of the present invention;

FIG. 13 is a side view similar to FIG. 3 illustrating a second embodiment of the invention;

FIG. 14 is an illustration of a first application of the second embodiment of the invention;

FIGS. 16A through 16S are a program listing of the control program for the Programmable Logic Controller of the collator of the second embodiment of the present invention;

FIG. 18 is a side view of a collator comprising a third embodiment of the invention;

FIG. 19 is a top view of the collator of FIG. 18;

FIG. 20 is a top view of a collator comprising a fourth embodiment of the invention;

FIG. 21 is a side view of the collator of FIG. 20;

FIG. 29 is a view similar to FIG. 20 showing a first variation of the fourth embodiment of the invention; and FIG. 30 is a side view similar to FIG. 21 further illustrating the first variation of the fourth embodiment of the invention.

DETAILED DESCRIPTION

Figure 1:
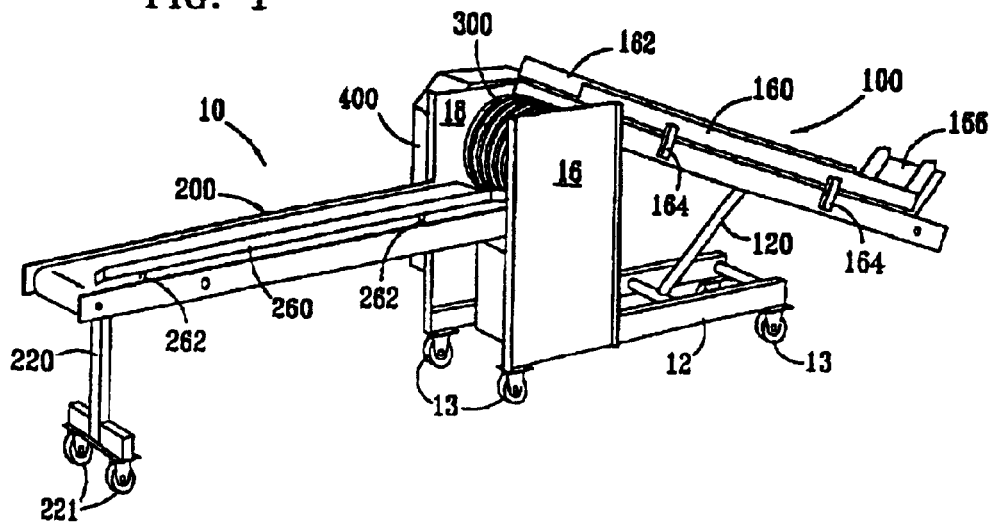
FIG. 1 is a perspective view taken from the discharge end of a collator incorporating a first embodiment of the present invention.
Figure 2:
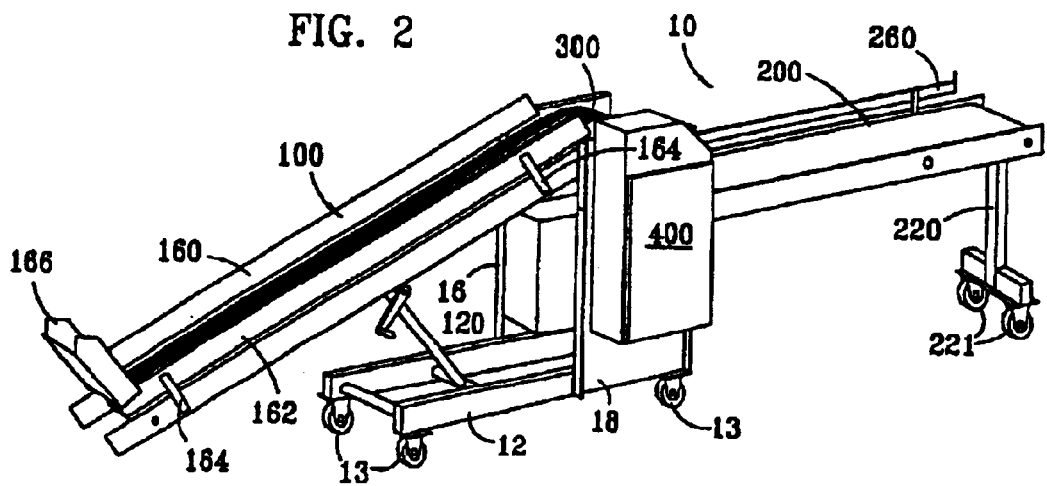
FIG. 2 is a perspective view taken from the input end of the collator of the first embodiment of the present invention.

Reference is now made to the Drawings wherein like reference characters denote like or similar parts throughout the Figures. Referring to FIGS. 1 and 2, therein is illustrated an air assisted collator 10 incorporating a first embodiment of the present invention. The collator 10 comprises a first conveyor 100 having a rotatable discharge drum 300 disposed at its discharge end, a second conveyor 200 positioned below the discharge end of the first conveyor 100 and a programmable logic controller 400 for controlling the operation of the collator 10.

Referring now to FIGS. 4 and 5, the conveyor 100 comprises a frame 112 supported by an adjustable mount 120 connected to a collator support frame 12. The collator support frame 12 includes a plurality of rollers 13 for mobility and side panels 16 and 18. A first idler roller 132 is adjustably mounted in the frame 112 at the inlet end of the first conveyor 100. A plurality of belts 141, 142, 143, 144, 145 and 146 extend longitudinally on conveyor 100. The two exterior belts on each side, belts 141, 142, 145 and 146, are $31/32$ inch wide belts provided by Eagle Belting Co. The two interior belts 143 and 144 are $3/4$ inch wide belting provided by MoL Belting. The use of the two interior belts 143 and 144 is advantageous for controlling upward movement of small bags.

As illustrated in FIG. 5, belts 141, 142, 143, 144, 145 and 146 each comprises a continuous loop extending over the first idler roller 132, around discharge drum 300, over a second idler roller 150, and back to the idler roller 132. Referring to FIG. 4, the two interior belts 143 and 144 have a surface that includes a friction enhancing coating that provides additional grab between the belts and the product packages carried thereon. As will be understood by those in the art, various types of belting may be used in practice of the present invention. Options include forming all of the belting from the material used in the belts 141, 142, 145 and 146, and forming all of the belting from the material used in belts 143 and 144.

Referring to FIG. 6B, therein is illustrated a cross-sectional view of the first conveyor 100. The first conveyor 100 includes two C-shaped side members 114 and 116 that support transverse member 118. Transverse member 118 supports a plurality of longitudinal belt supports 171, 172, 173, 174, 175 and 176 each supporting a respective conveyor belt 141, 142, 143, 144, 145, and 146. The present invention includes an improvement over conveyors of prior art collators in that the longitudinal support members 171–176 have top profiles complimentary to the bottom profile of the respective belts 141–146, thereby supporting and stabilizing the belts.

As illustrated in FIG. 2, the first conveyor 100 further includes two bagged product guide rails 160 and 162 that are adjustably mounted on frame 112 by mounting brackets 164. A feed chute 166 is attached to frame 112. The guide rails 160 and 162 terminate at the discharge drum 300.

FIGS. 4 and 5 illustrate the second conveyor 200. The second conveyor 200 includes a frame 212 supported by an adjustable leg 220 attached at the distal end of the conveyor 200. The leg 220 includes at least two rollers 221 for mobility. A drive roller 230 is positioned at the receiving end of the second conveyor 200 and is driven by a DC drive motor (not shown). A single belt 240 extends longitudinally on the second conveyor 200. The belt 240 is preferably a 10¼ inch wide belt manufactured by Thermoid Industries under the trademark Grip-Tex, although other belts may also be used. The belt 240 is configured in a continuous loop positioned around the drive roller 230 and an idler roller located at the distal end of the conveyor 200 (not shown). The second conveyor 200 further includes an adjustable bagged product guide rail 260. The rail 260 is adjustably mounted on the conveyor frame 212 by mounting brackets 262.

Turning now to FIG. 6A, the rotatable discharge drum 300 is positioned at the discharge end of the first conveyor 100. The rotatable discharge drum 300 is comprised of a shaft 310 having a plurality of disks 341, 342, 343, 344, 345 and 346 mounted thereon by means of a key and keyway (FIGS. 7A and 7C). Each disk respectively receives one of the belts 141, 142, 143, 144, 145 and 146. As heretofore discussed, the two interior belts 143 and 144 have a surface that includes a friction enhancing coating that provides additional grab between the belts and the product packages carried thereon. As illustrated in FIGS. 7B and 7D, the two interior belts 143 and 144 also have a different cross-sectional profile from belts 141, 142 and 145 and 146. Therefore, disks 343 and 344 have a correspondingly different profile for receiving belts 143 and 144 (FIGS. 7C and 7D). Disks 341, 342, 345 and 346 receive belts 141, 142, 145 and 146 respectively (FIGS. 7A and 7B).

As illustrated in FIGS. 3, 5 and 6A, the shaft 310 of rotatable drum 300 includes a pulley 330 that receives drive belt 332. The rotatable drum 300 is driven by a continuous speed AC drive motor 334 mounted on side panel 18, acting through a motor pulley 336 and the drive belt 332.

Referring again to FIG. 6A, the product guide plate 370 is adjustably mounted on the side panel 18 by a fastener 372 and the product guide plate 374 is adjustably mounted on the side panel 16 by a fastener 376. The product guide plates 370 and 374 are adjusted transverse to the direction of movement of the belts depending on the product bag width and desired position of the product bag on the drum 300.

Figure 5A:
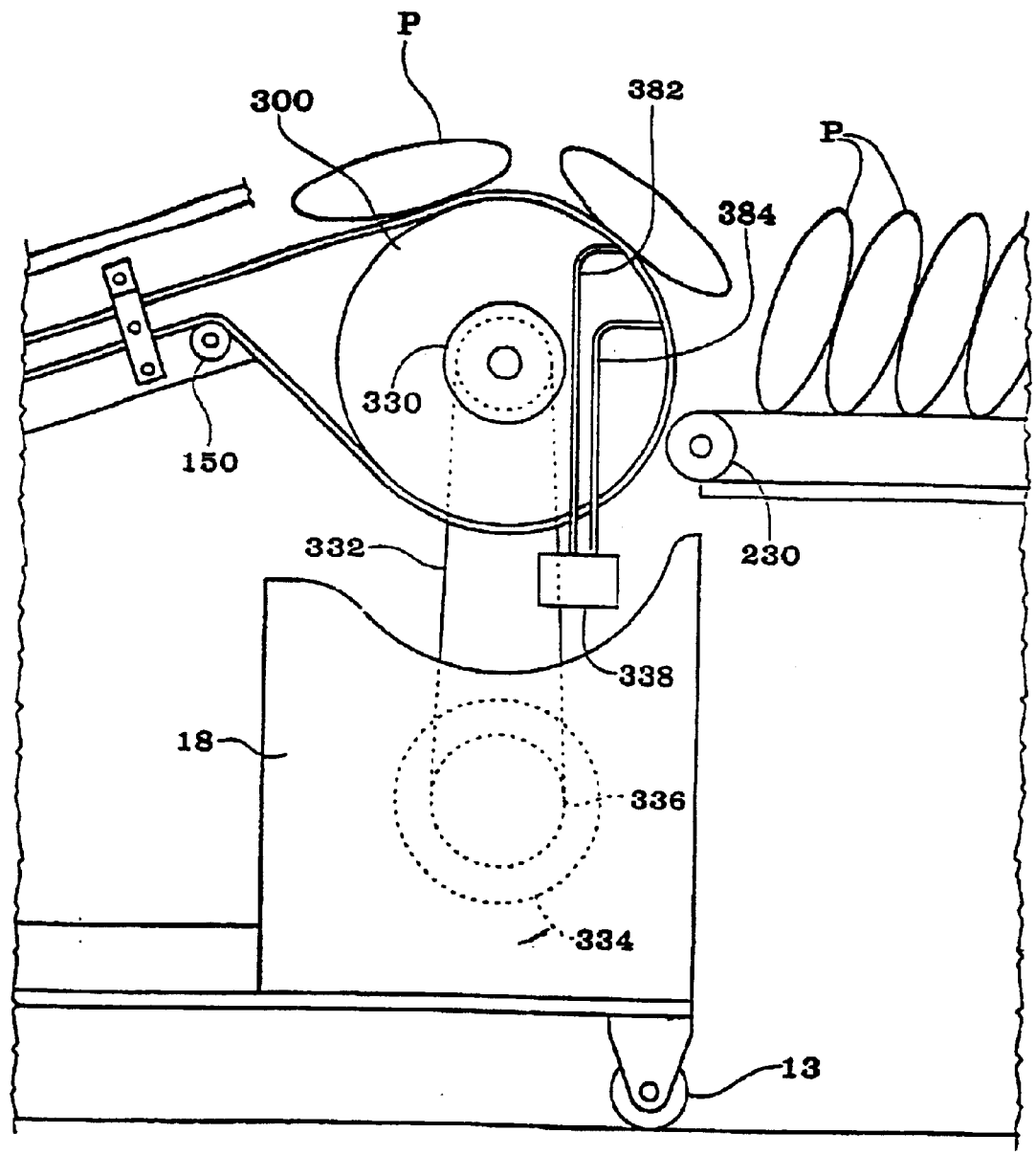
FIG. 5A is an enlargement of a portion of FIG. 5.

Referring to FIGS. 5A and 6, therein is illustrated an upper pair of air nozzles 382 and a lower pair of air nozzles 384 positioned between the rotating disks 342, 343, 344 and 345 of the drum 300. Nozzles 382 and 384 are connected to a conventional compressed air source 388. It will be understood by those skilled in the art that any non-corrosive pressurized gas may be used in the practice of the invention. The upper air nozzles 382 are positioned to discharge an air blast that will strike large and extra large size product bags P having heights ranging from about 10 to about 18 inches. The lower nozzles 384 are positioned to discharge an air blast that will strike small and medium product bags P having heights ranging from about 4 to about 10 inches. The upper nozzles discharge air at about 60 psi (FIG. 8A), and the lower nozzles discharge air at about 30 psi (FIG. 8B) because the weight of the larger product bags requires more thrust in order to tip the bags received by the second conveyor 200 to a desired 70 degree angle from horizontal.

A sensor 600 indicates when the product bag P is properly positioned to receive the air blast for uprighting the product bag. The sensor 600 includes a light beam source 602 positioned on a first side of the second conveyor, a reflector 604 positioned across from the light source on the second side of the second conveyor and a light beam receiver 606 positioned on the first side of the second conveyor 200. A falling product bag P interrupts the light beam and generates a signal indicating the presence of the product bag. It will be understood that any type of sensor capable of indication of the position of the product bag may be used in the practice of the invention. As is clearly shown in FIG. 4, the light path between the source, the reflector, and the receiver is angular, which allows detection of all bag sizes without adjustment.

Turning now to FIG. 9, therein is illustrated a control panel 410 for the programmable logic controller ("PLC") 400. The panel 410 is provided with an emergency stop switch 412, a variable bag size switch 414, and a variable belt speed switch 416. The bag size switch 414 includes predetermined settings for small, medium, large, extra large bags, and for continuous feed operation. The belt speed switch 416 controls the speed at which the belt 240 on the second conveyor 200 moves when it is activated.

In operation, an operator selects a product bag size setting depending on the height of the product bag. As previously discussed, small bags are typically about 4 to about 6 inches in height, medium bags are about 6 to about 10 inches in height, large bags are about 10 to about 13 inches in height, and extra large and commercial bags are about 13 to about 18 inches in height. The bag size selector switch 414 signals the PLC to select either the lower or upper nozzles to discharge air when the nozzles are activated. The bag size switch 414 also signals the PLC 400 to select from a pre-programmed set of second conveyor indexing distances. As previously described, the belt 240 of the second conveyor 200 is driven by a DC motor. The DC motor is activated by the PLC 400 for predetermined milliseconds in order for the belt 240 to travel a predetermined distance. The predetermined activation time is set to move the belt 240 (at a preselected speed) approximately 2 inches for a small bag, about 3 inches for a medium bag, about 4 inches for a large bag, and about 5 to 6 inches for an extra large or commercial bag.

The belt speed switch 416 signals the PLC 400 to direct the speed at which the DC motor is run during the milliseconds it is activated. Product density determines the speed at which the belt 240 should run. As previously discussed, denser product packages have narrower bag widths. Therefore in order to achieve proper collation, the belt 240 is driven at a faster speed (generating more incremental distance of travel during the interval of activation) for product packages having greater widths. For example, potato chips require the belt 240 to be run faster than for the more dense and narrower product package containing corn chips.

During operation, the PLC 400 receives a signal from the sensor 600 which indicates that a bag has been received on the second conveyor 200 and is in the proper position to receive an air blast to tip the bag forward. Different products require different air blast durations: small about ¼ second; medium about k second; large about ½ second; extra large about ¾ second. Toggle switch 415 shown in FIG. 9 increases the air blast duration by ¼ second.

Operation of the collator of the present invention begins with inputting bag size and belt speed data by means of the switches 414 and 416 of FIG. 9. Thereafter, whenever the sensor detects a bag the PLC 400 causes an air blast of proper pressure and duration to be emitted either from nozzles 382 or nozzles 384, whereby the bag is collated. If necessary, air blast duration is adjusted by means of the toggle switch 415.

Figure 10:
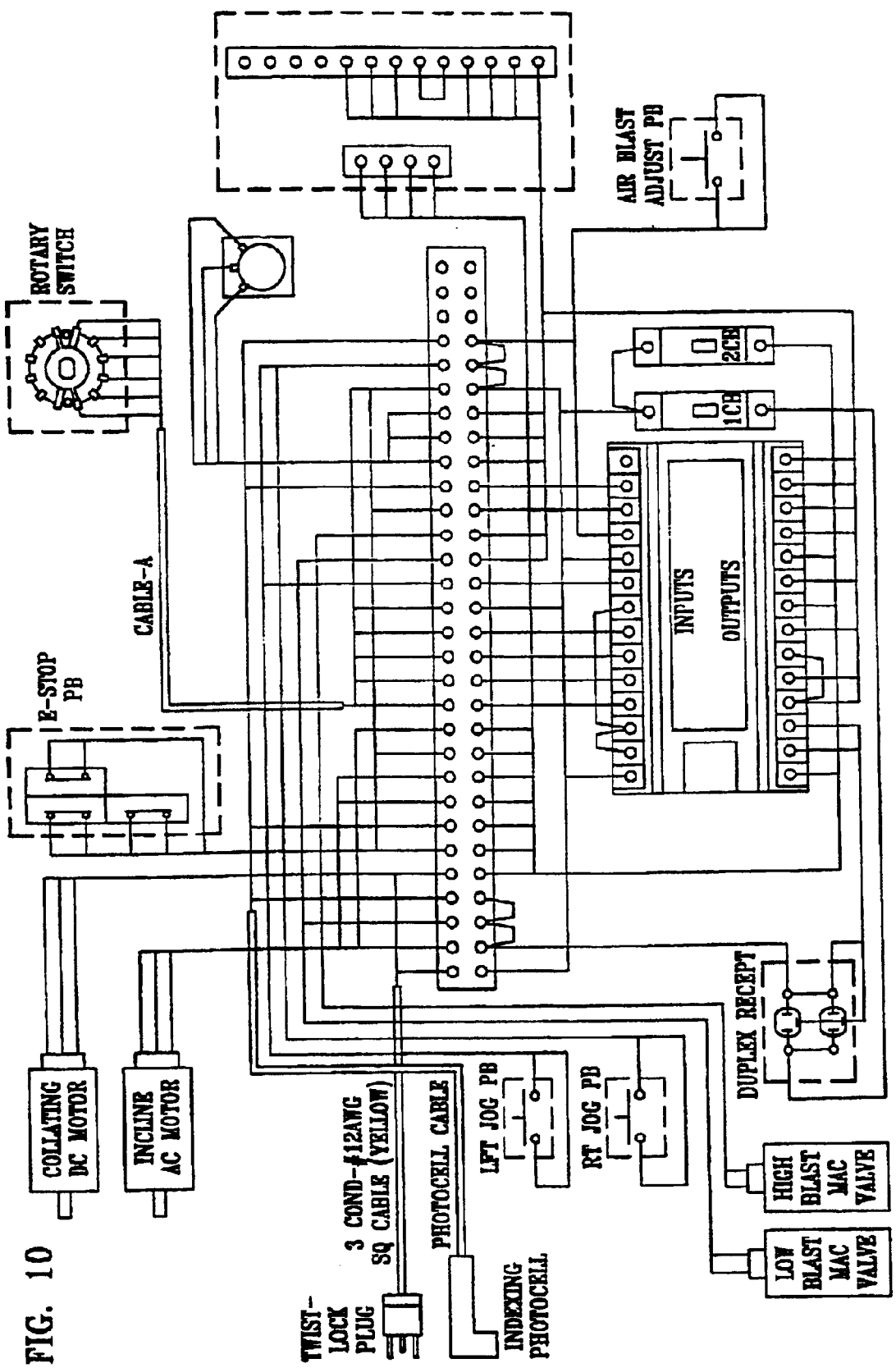
FIG. 10 is a wiring diagram for the collator of the first embodiment of the present invention.
Figure 11A:
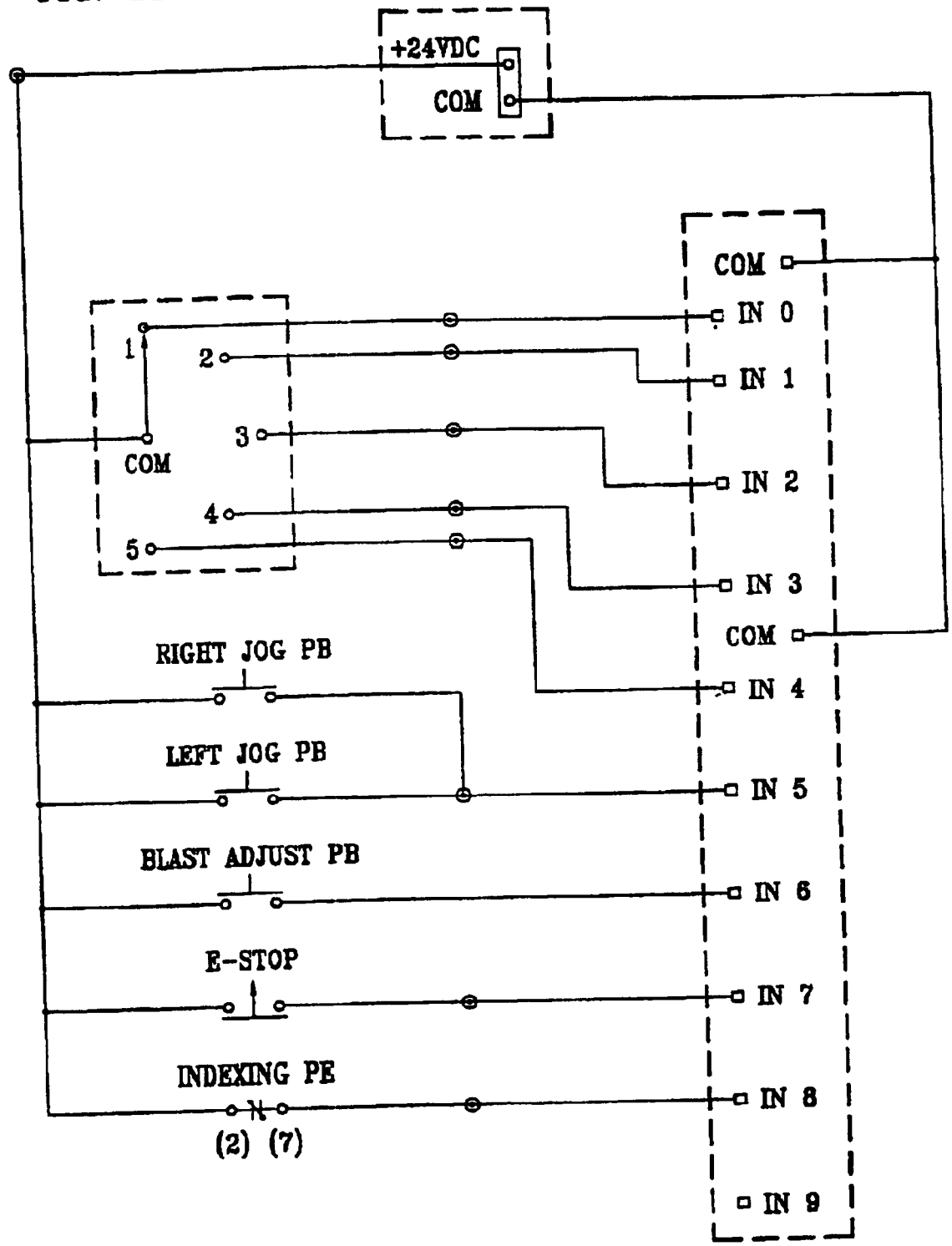
FIG. 11A is a DC wiring schematic for the collator of the first embodiment of the present invention.
Figure 11B:
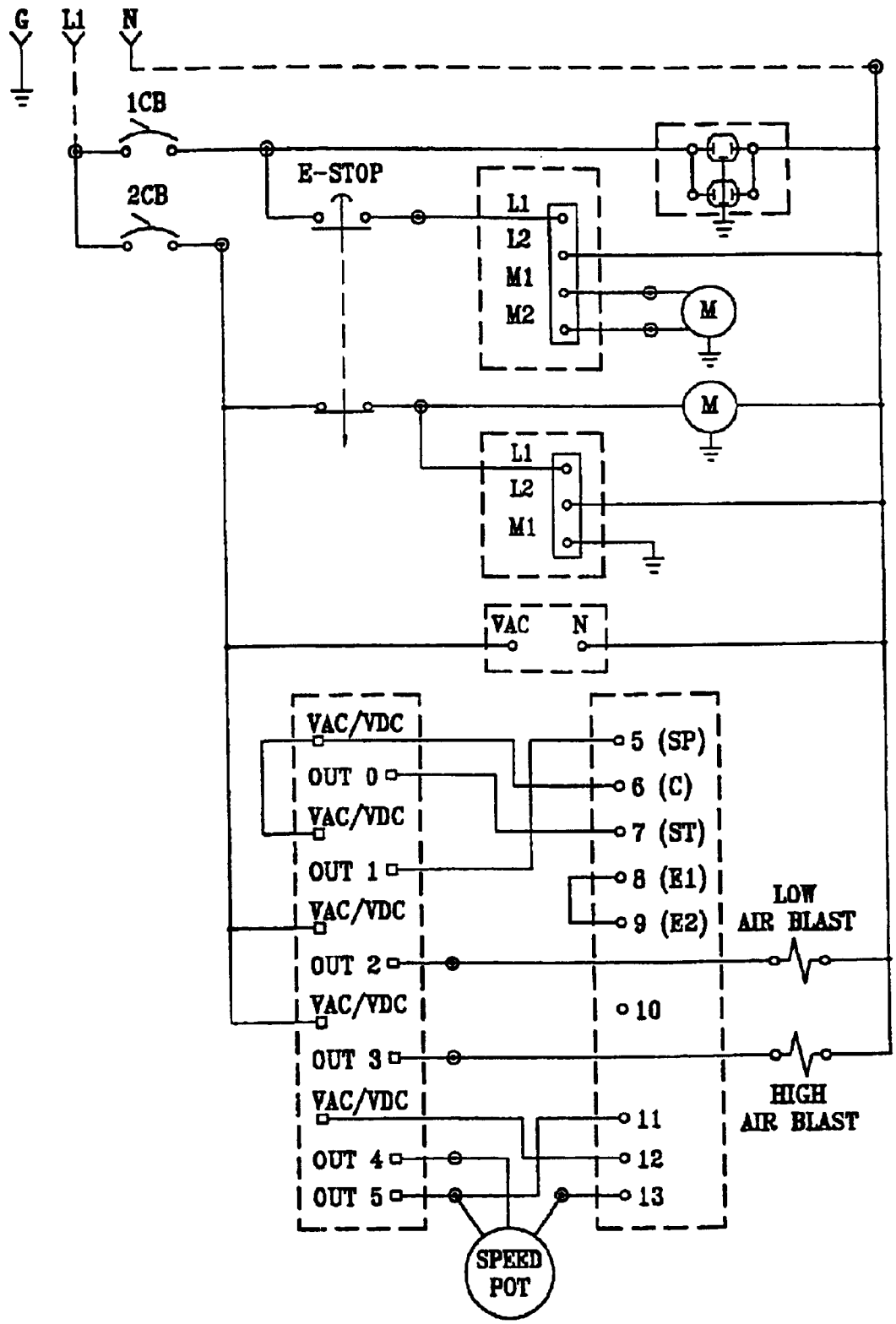
FIG. 11B is an AC wiring schematic for the collator of the first embodiment of the present invention.

Referring now to FIGS. 10, 11A and 11B, the electrical wiring for the first embodiment of the present invention is illustrated. FIGS. 12A through 12G comprise the program listing for the Programmable Logic Controller (PLC) 400 of the present invention.

FIGS. 13, 14, 15, 16A through 16S, inclusive, and 17A through 17F, inclusive, illustrate a collator 700 comprising a second embodiment of the invention. Many of the component parts of the collator 700 are substantially identical in construction and function to the component parts of the collator 10 illustrated in FIGS. 1 through 12A–G, inclusive, and described hereinabove in conjunction therewith. Such component parts are designated in FIGS. 13 through 17A–F, inclusive, with the same reference numerals utilized in the description of the first embodiment of the invention, but are differentiated thereof by means of a prime (') designation.

The conveyor 200' of the collator 700 is driven by a two speed motor. The sensor 600' detects each product bag P as it falls onto the conveyor 200'. The output of the sensor 600' is directed to the programmable logic controller 400'.

The collator 700 is adapted for utilization in two different modes. Referring to FIG. 14, when operating in the first mode, the product bags P are accumulated in groups G on the conveyor 200. Each group G contains an identical number of product bags P. This allows the operator to transfer groups G comprising identical numbers of product bags P to cartons or other containers without bothering to count the product bags prior to transfer.

In the operation of the collator 700 in the first mode, the conveyor 200' is normally operated in its slow speed which is coordinated with the rate at which product bags are received on the conveyor 200' such that the product bags P are positioned in an abutting relationship on the conveyor 200'. The output signals from the sensor 600' are accumulated in the programmable logic controller 400' until the desired number of bags comprising each group G has been reached. When a particular group G has been filled with a desired number of product bags P, the programmable logic controller 400' operates the conveyor 200' at its high speed for a predetermined period of time. In this manner a gap of predetermined length is established 5 between the last product bag P in a first group G and the first product bag P in the next succeeding group G.

In its second operational mode, the collator 700 is provided with a deflector 710 mounted at the distal end of the conveyor 200'. The deflector 710 is operated by an electrical solenoid, a pneumatic cylinder, a hydraulic cylinder, etc. operating through a conventional lever mechanism. Although the deflector 710 is shown positioned horizontally in FIG. 13, such positioning is not within the normal operating parameters of the deflector 710.

Figure 15:
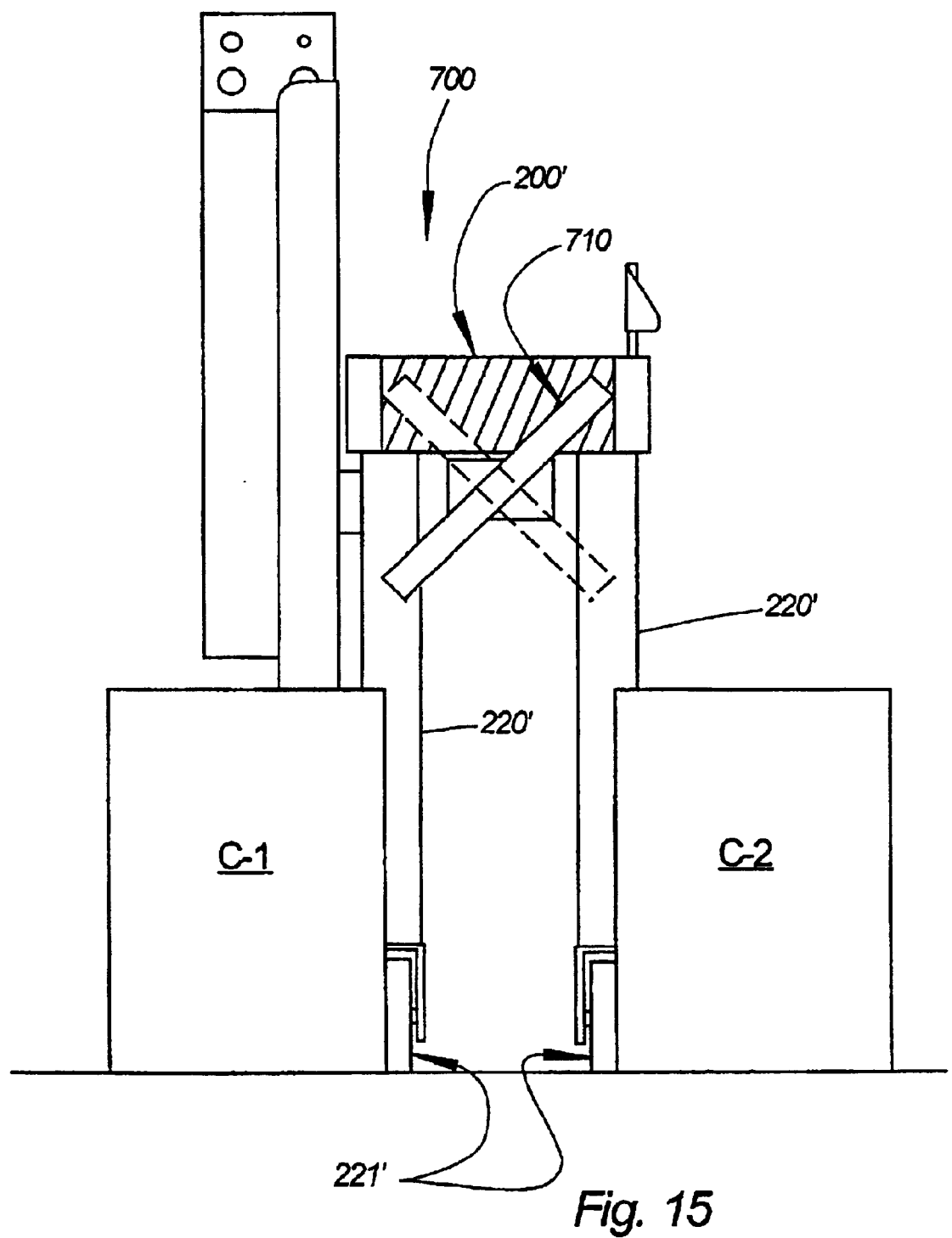
FIG. 15 is an end view of the embodiment of the invention shown in FIG. 13.
Figure 17A:
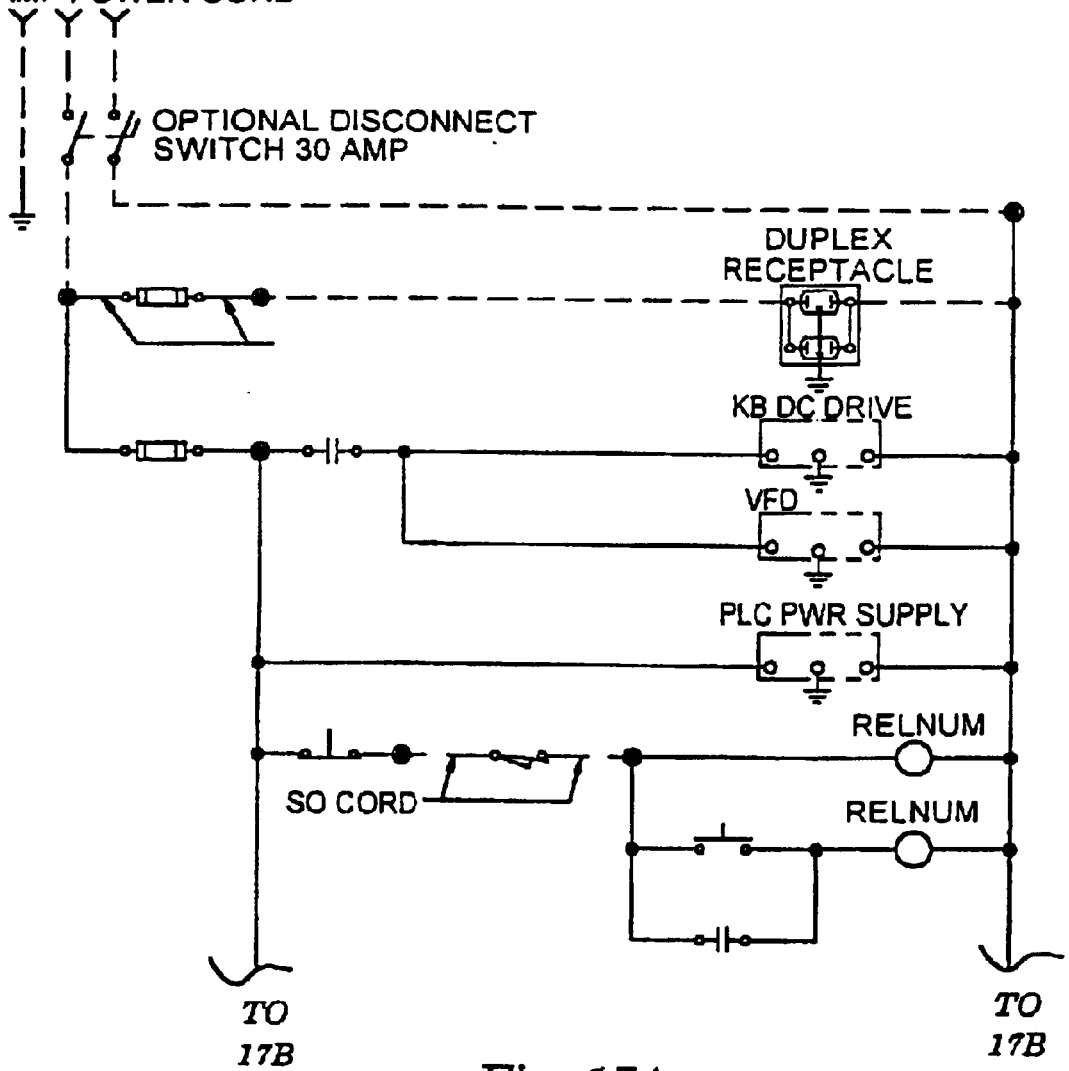
FIGS. 17A through 17F comprise the electrical wiring diagram for the second embodiment of the invention.
Figure 17B:
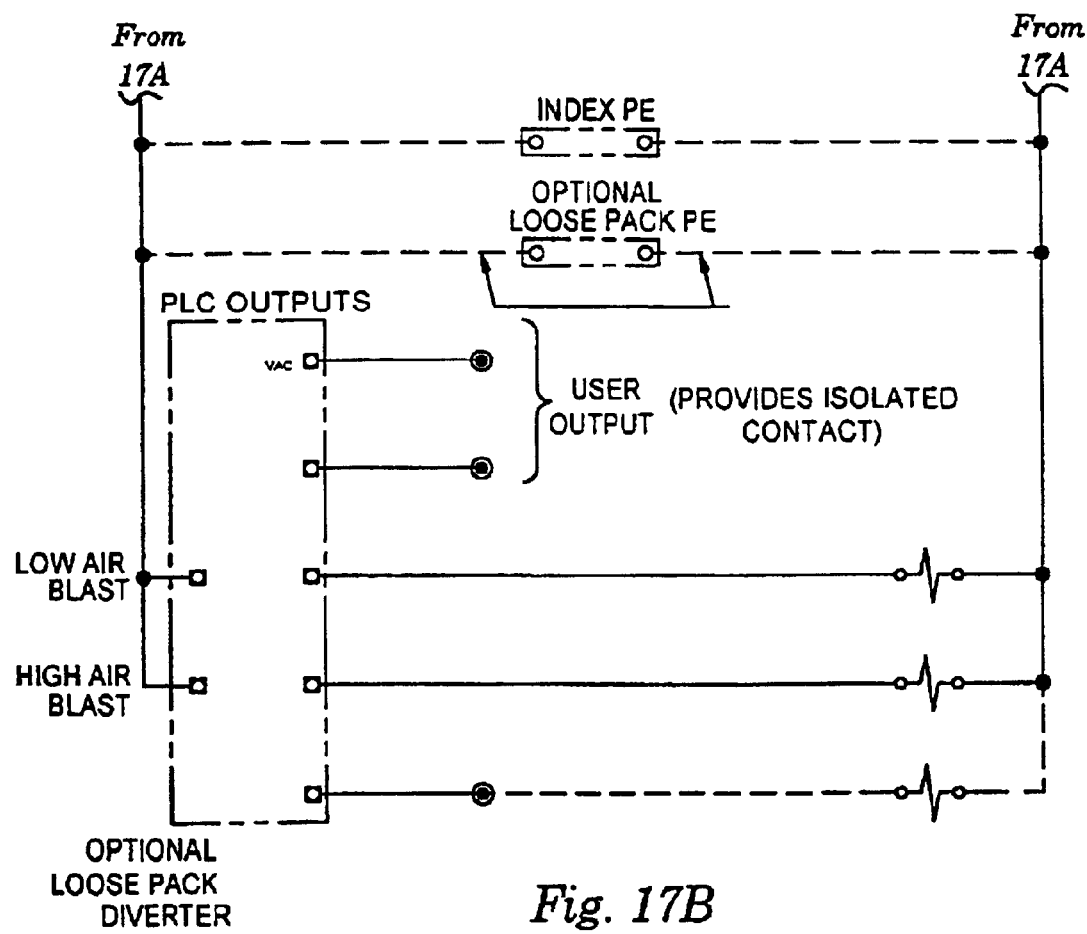
Figure 17C:
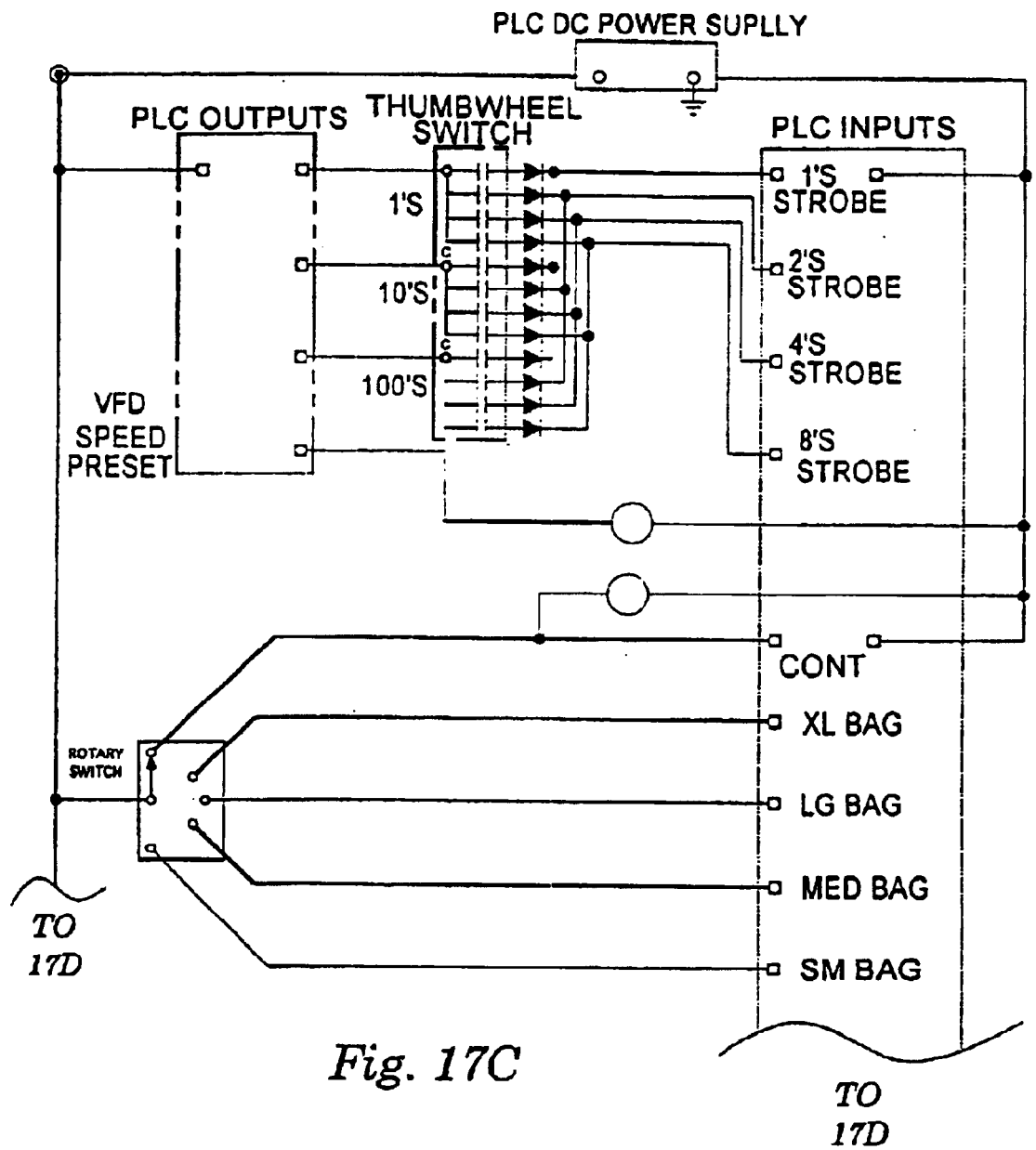
Figure 17D:
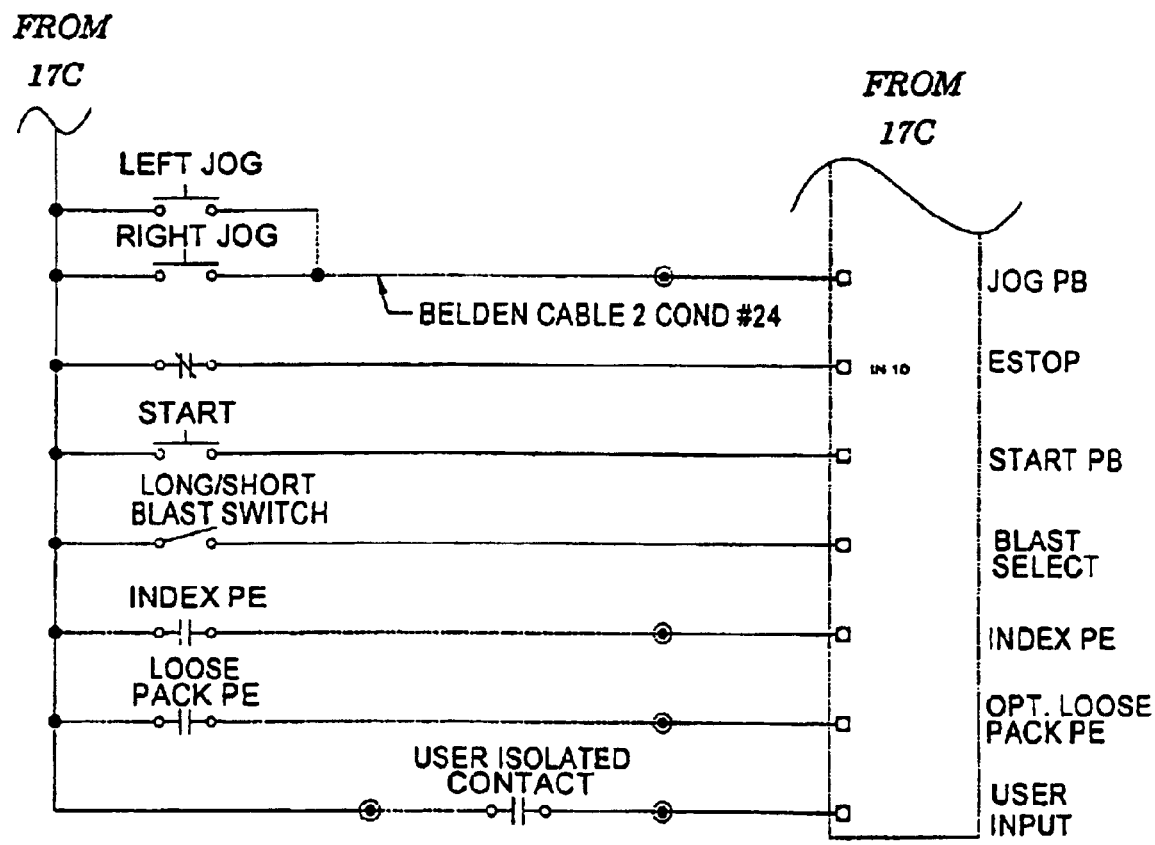
Figure 17E:
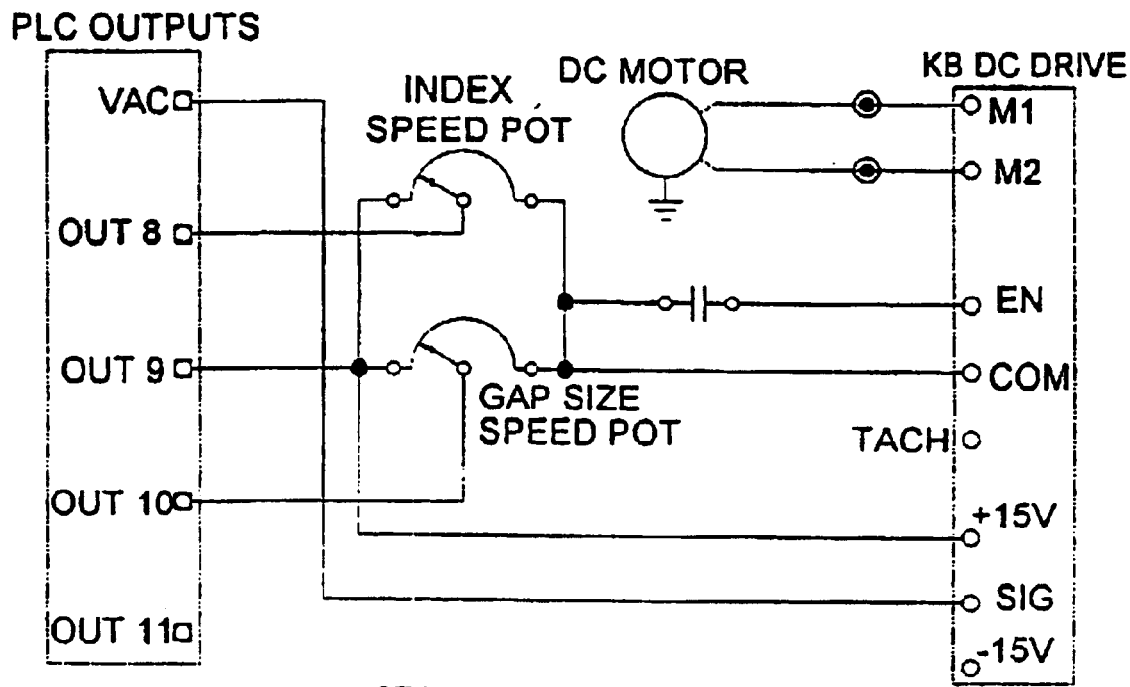
Figure 17F:
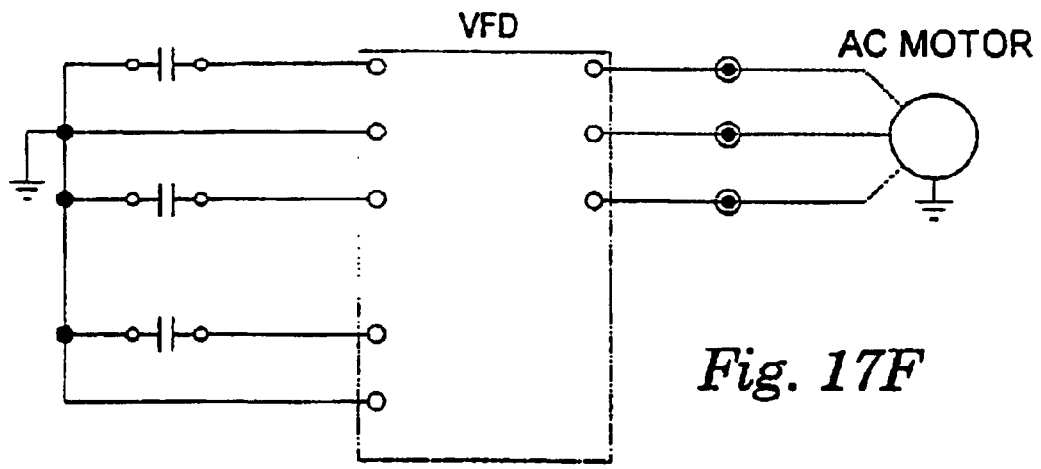

Referring to FIG. 15, the deflector 710 is initially positioned as illustrated in full lines. When so positioned, the deflector 710 directs product bags discharged from the conveyor 200' into a first container C-1. The positioning of the deflector 710 continues until the programmable logic controller 400' has received output signals from the sensor 600' and/or from any other source indicating that a predetermined number of product packages have been discharged into the container C-1.

When the predetermined number of product bags have been discharged into the container C-1, the positioning of the deflector 710 is changed from the position shown in full lines in FIG. 15 to the position shown in dashed lines therein. Thereafter the deflector 710 directs product bags discharged from the conveyor 200' into the container C-2. During discharge of the product bags into the container C-2, the operator removes the now full container C-1 and replaces the container C-1 with an empty container. The discharge of product bags into the container C-2 continues until the programmable logic controller 400' receives output signals from the sensor 600' and/or any other source indicating that a predetermined number of product bags have been discharged into the container C-2. At that point, the positioning of the deflector 710 is reversed and the foregoing cycle is repeated.

A more complete understanding of the operation of the collator 700 may be had by reference to FIGS. 17A–17F, inclusive, wherein the wiring diagram of the collator 700 is illustrated, and to FIGS. 16A–16S, inclusive, wherein the computer program contained within the programmable logic controller 400' is illustrated.

Referring to FIGS. 18 and 19, there is shown a collator 800 comprising a third embodiment of the invention. The collator 800 comprises component parts which are substantially identical in construction and function to the component parts of the collator 10 and the collator 700 as illustrated in FIGS. 1–17, inclusive, and described hereinabove in conjunction therewith. Further description of such identical component parts has been omitted from the description of the collator 800 for brevity.

The collator 800 differs from the collators 10 and 700 in that the collator 800 comprises spaced, parallel discharge conveyors 802 and 804 which are separated by a center guide rail 806. The conveyors 802 and 804 each comprise spaced, parallel belts 808.

The collator 800 further comprises spaced, parallel product receiving belts 812 and 814 which are separated by a center guide rail 816. The belt 812 receives bagged food products from the discharge conveyor 802, and the belt 814 receives bagged food products from the discharge conveyor 804. In each instance, the bagged food products are collated by an air blast and are arranged in groups each comprising a predetermined number of bagged food products. It will therefore be understood that the construction and operation of the collator 800 is identical to the construction and operation of the collators 10 and 700 except that the collator 800 receives, collates; and groups bagged food products along spaced, parallel paths defined by the conveyors 802 and 804 and by the belts 812 and 814, respectively.

Bagged food products received by the collator 800 are directed either to the conveyor 802 or to the conveyor 804 by a chute 820 and a chute 822 which are located at the input end of the conveyor 100. The chute 822 is fixedly supported and functions to direct bagged food products either to the conveyor 802 or to the conveyor 804. The chute 820 is supported for rocking movement about an axis 824 under the action of an activator 826 which may comprise a pneumatic cylinder, a hydraulic cylinder, and electrical solenoid, etc. which is connected to the chute 820 by a suitable linkage and which is operated under the control of the programmable logic controller of the collator 800. The chute 820 has two operating positions, one of which directs bagged food products onto the chute 822 and from the chute 822 onto the conveyor 802, and the other of which directs bagged food products onto the chute 822 and from the chute 822 onto the conveyor 804.

The dual discharge and dual receiving conveyors comprising the collator 800 are mounted on a common frame/housing which is substantially identical in construction and function to the frame/housing of the collator 10 and the frame housing of the collator 700. The dual discharge conveyors operate at constant speed and can be driven by a common motor. The dual receiving conveyors are preferably driven by separate motors so that a selected receiving conveyor can be operated at high speed to separate groups of bagged food products.

In the operation of the collator 800, the chute 820 may be operated pursuant to a variety of operational modes. For example, the positioning of the chute 820 may be switched between the two operational configurations thereof each time a bagged food product is received by the collator 800. Preferably, however, the chute 820 remains in one of its operational configurations until a predetermined number of bagged food products has been received by the collator 800, for example, 6, 8, or 10 bagged food products. When the predetermined number of bagged food products has been received by the collator 800, the chute 820 is pivoted to its alternate operational configuration and remains therein until the predetermined number of bagged food products has been received by the collator 800, whereupon the operational cycle begins again.

The use of the collator 800 is advantageous in that the bagged food product throughput rate which can be handled by the collator 800 is approximately double the bagged food product throughput rate which can be handled either by the collator 10 or by the collator 700. The collator 800 is therefore adapted for use with recently introduced food product bagging machines which are capable of bagging food products at a substantially higher rate than has heretofore been the case.

Referring to FIGS. 20 through 28, inclusive, there is shown a dual track air assisted collator 900 incorporating a fourth embodiment of the invention. The collator 900 comprises spaced, parallel conveyor assemblies 902 and 904 each including a discharge conveyor 906 and a receiving conveyor 908. The discharge conveyors 906 each comprise a plurality of belts 910.

The collator 900 further includes a diverter 912. The diverter 912 functions to receive bagged food products, for example, from a bagging machine, and to selectively direct the received bagged food products either to the conveyor assembly 902 or to conveyor assembly 904. As will become apparent hereinafter, the diverter 912 can also be used to direct larger sizes of bagged food products along a centrally disposed path comprising both of the conveyor assemblies 902 and 904.

Figure 22:
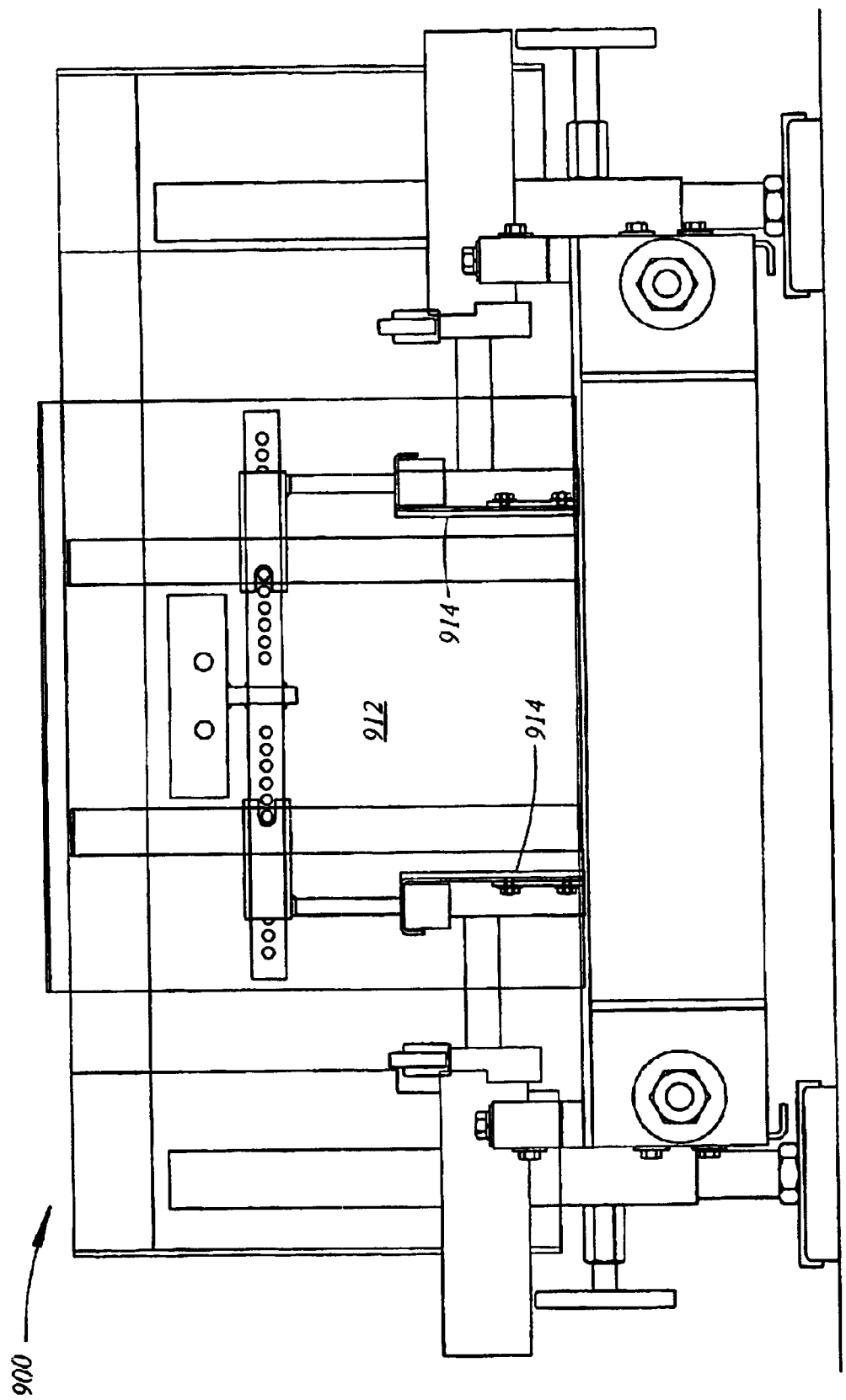
FIG. 22 is an enlarged end view of the collator of FIG. 20 in which certain parts have been omitted in order to better illustrate certain features of the invention.
Figure 23:
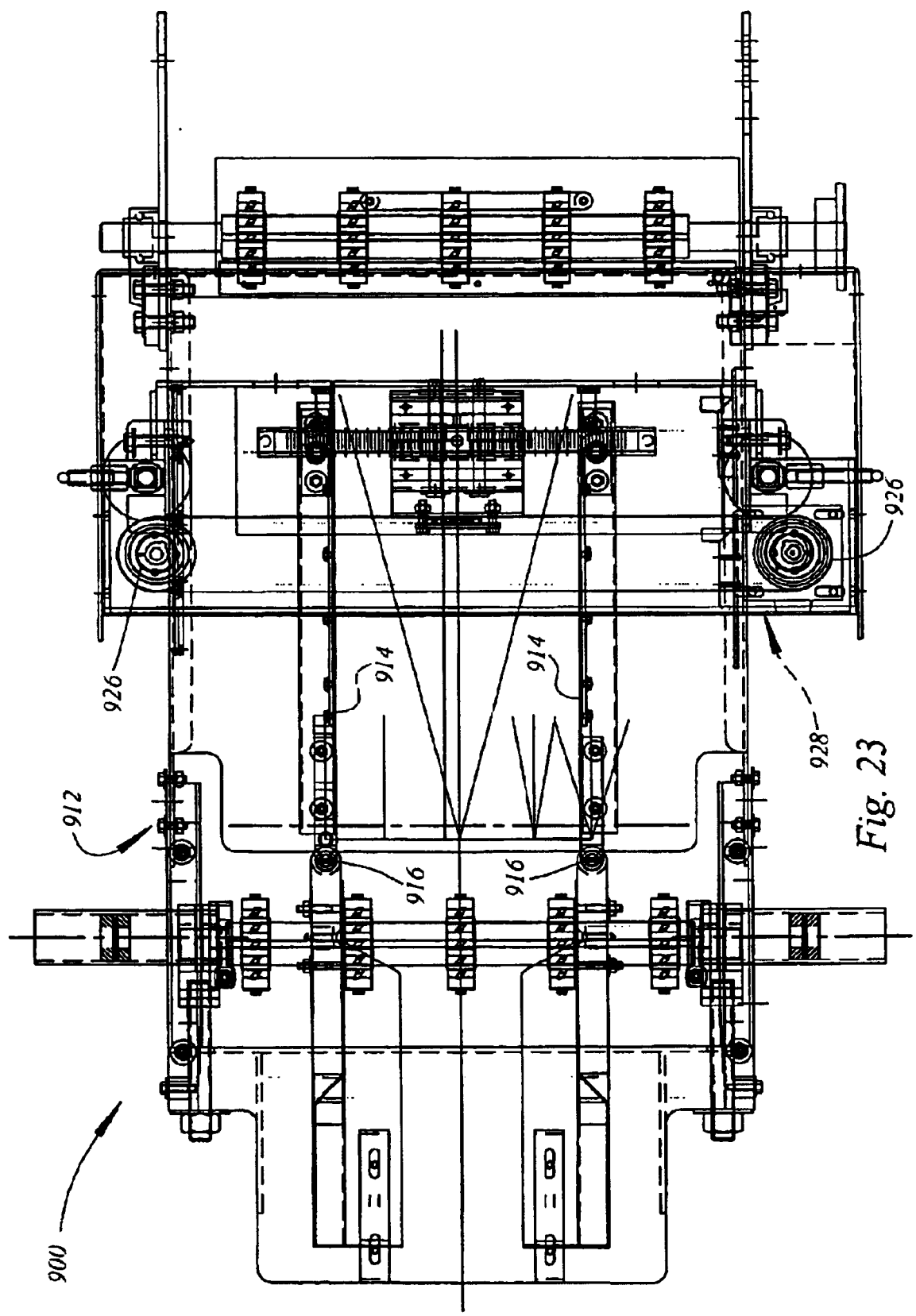
FIG. 23 is an enlarged top view of a portion of the collator of FIG. 20 in which certain parts have been omitted more clearly to illustrate certain features of the invention.
Figure 24:
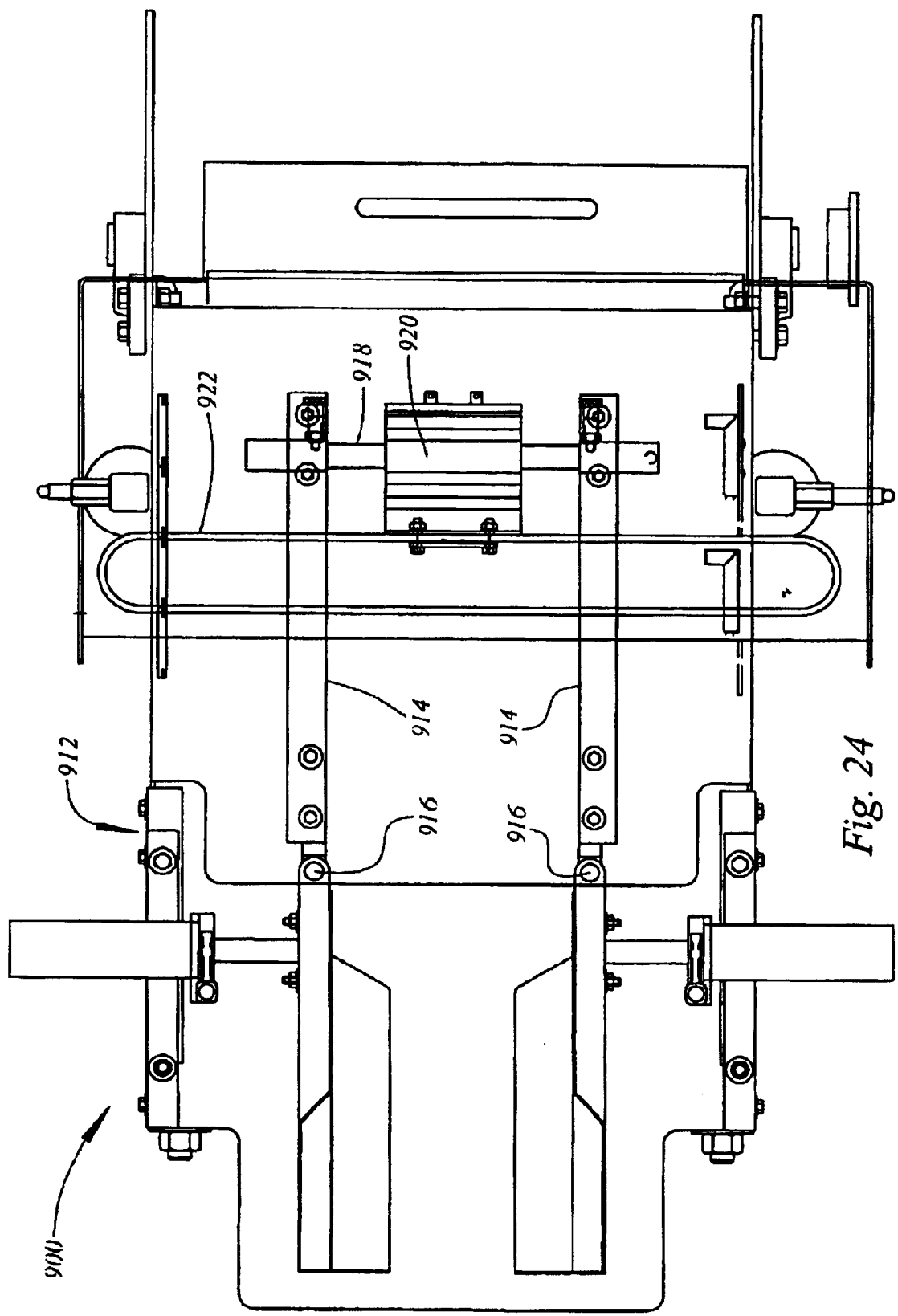
FIG. 24 is a view similar to FIG. 23 in which additional parts have been omitted more clearly to illustrate certain features of the invention.
Figure 25:
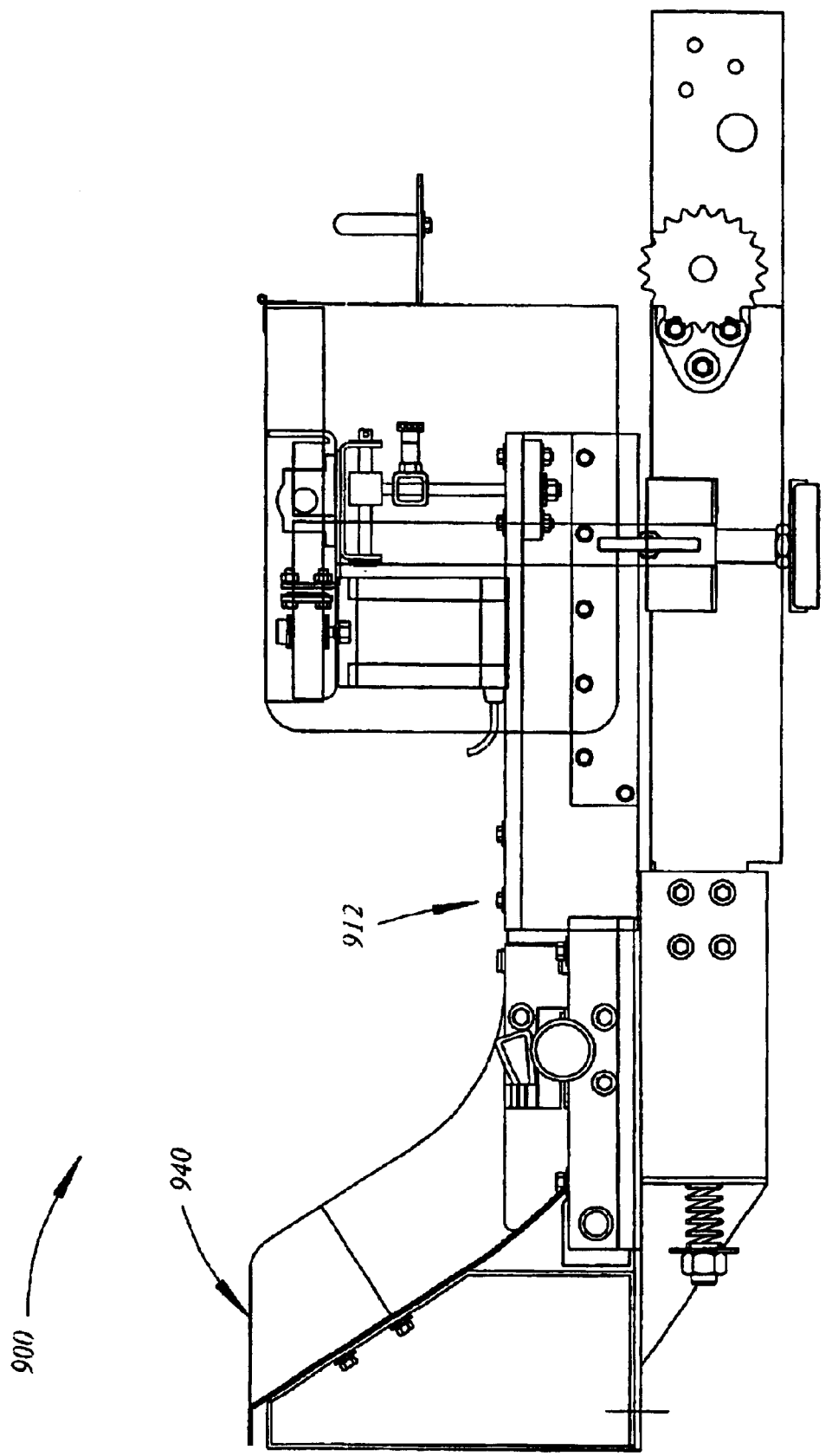
FIG. 25 is an enlarged partial side view of the collator of FIG. 20.

Referring particularly to FIGS. 22, 23, and 24, the diverter 912 comprises a pair of spaced, parallel diverter members 914. The diverter members 914 are supported for pivotal movement about spaced, parallel, vertical axes defined by pivot pins 916. The distal ends of the diverter members 914 are pivotally connected to a rod 918 which is in turn connected to a fixture 920. The fixture 920 is connected to a belt 922 which is trained around pulleys 926. The belt 922 is actuated by a motor 928 to selectively pivot the diverter members 914 about the axes defined by the pivot pins 916.

Figure 26:
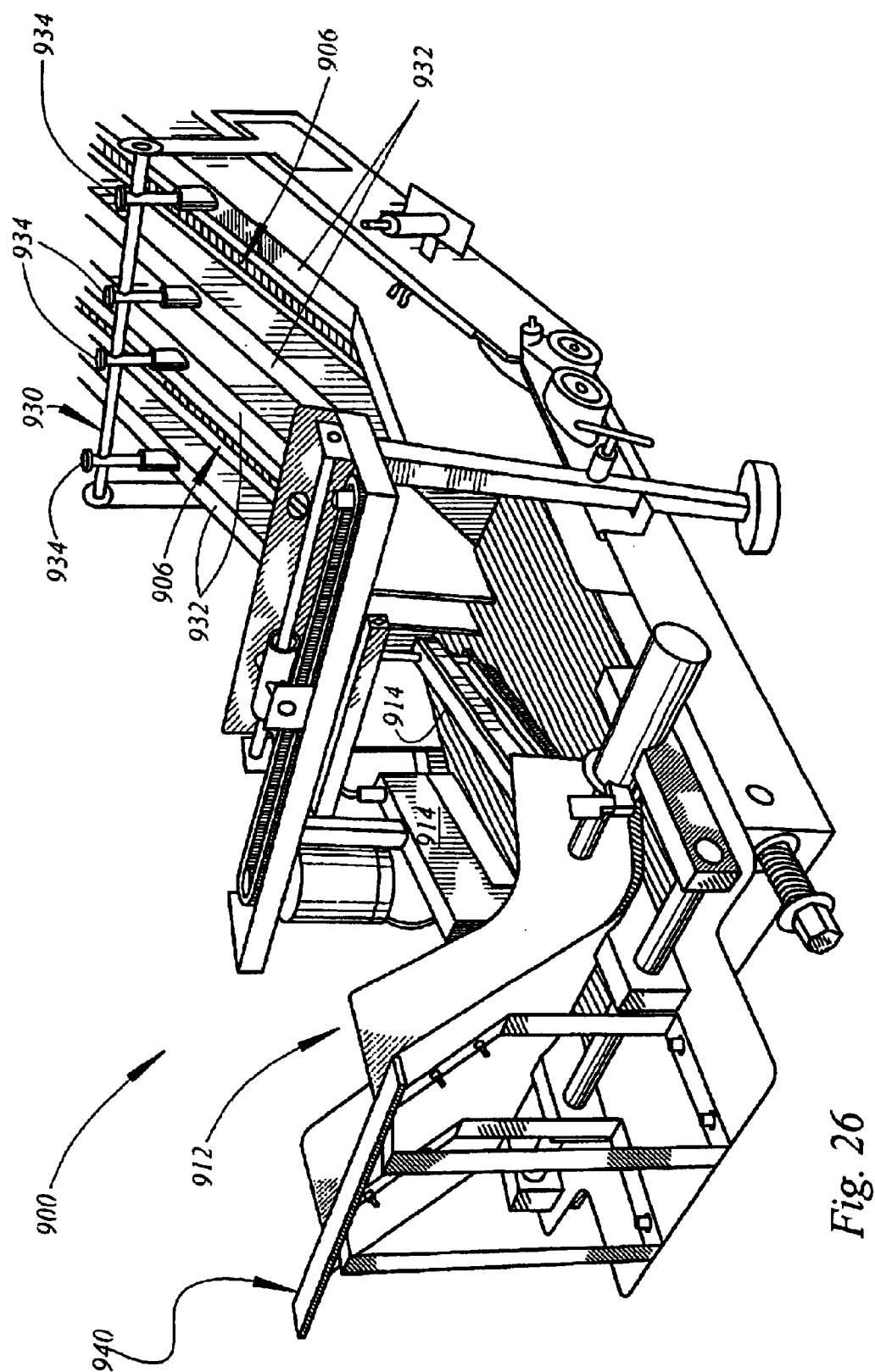
FIG. 26 is an enlarged partial perspective view of the collator of FIG. 20 showing the component parts thereof in a first orientation.
Figure 27:
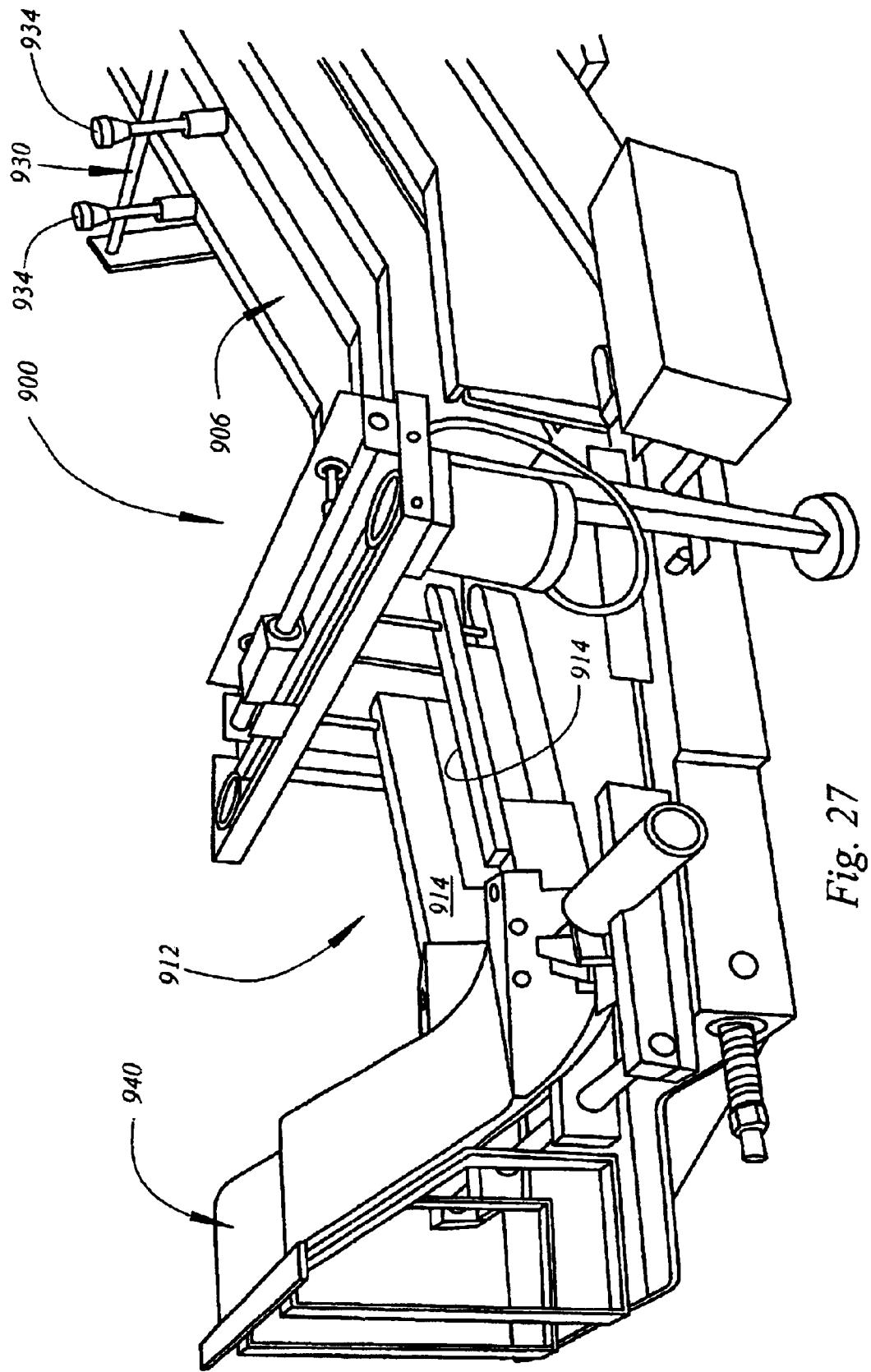
FIG. 27 is an enlarged partial perspective view of the collator of FIG. 20 showing the components parts thereof in a second orientation.
Figure 28:
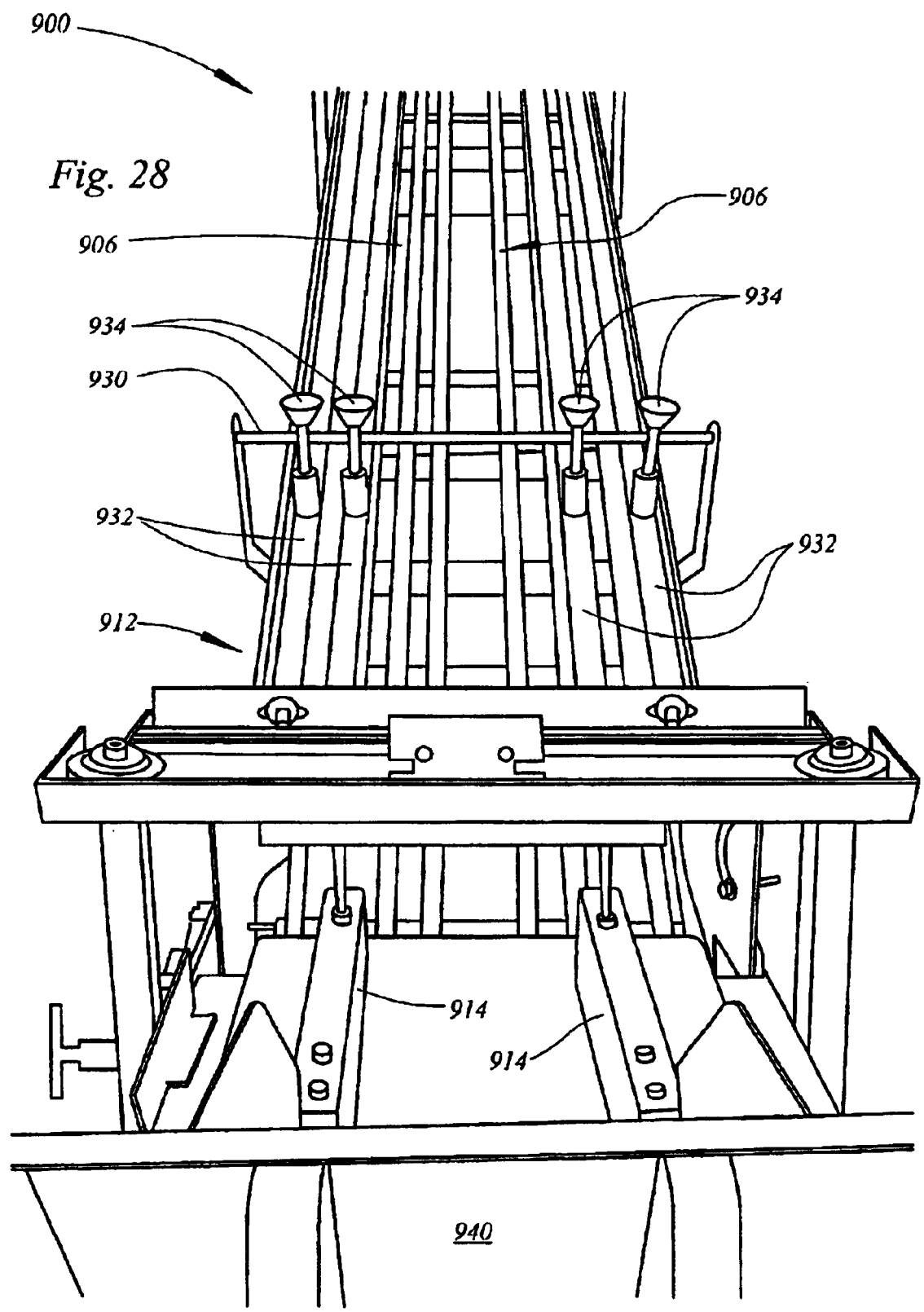
FIG. 28 is an enlarged partial end view of the collator of FIG. 20 showing the component parts thereof in a third orientation.

Referring to FIGS. 26, 27, and 28, inclusive, the dual track air assisted collator 900 further includes support rods 930 extending transversely across the discharge conveyors 906 comprising the conveyor assemblies 902 and 904. Guide members 932 are supported from the support rods 930 and are selectively positionable relative to the discharge conveyors 906, it being understood by those skilled in the art that the positioning of the guide members 932 depends upon the sizes of the bagged food products being conveyed. Locking members 934 are provided for securing the guide members 932 in selected locations.

FIG. 26 illustrates the diverter members 914 positioned to direct bagged food products to the discharge conveyor 906 comprising the conveyor assembly 902. FIG. 27 illustrates the diverter members 914 positioned to direct bagged food products to the discharge conveyor 906 comprising the conveyor assembly 904.

FIG. 28 illustrates an important feature of the invention wherein the collator 900 is configured for use in conjunction with larger sizes of bagged food products. The diverter members 914 are centrally disposed, and the guide members 932 are moved outwardly and secured in widely spaced apart locations to define a central discharge conveyor path. As will be understood by those skilled in the art, the central conveyor path includes belts 910 which comprises component parts of both the discharge conveyor 906 of the conveyor assembly 902 and the discharge conveyor 906 of the conveyor assembly 904.

In the operation of the collator 900, bagged food products are received on a slide 940 from, for example, a bagging machine. As will be appreciated by those skilled in the art, the operation of the collator 900 does not depend on receiving bagged food products directly from a bagging machine. Rather, bagged food products can be directed from a bagging machine to various types of storage and/or transfer devices which in turn direct the bagged food products to the collator 900.

Upon receipt in the collator 900, bagged food products move downwardly along the slide 940 under the action of gravity. From the slide 940 the bagged food products move into the space between the diverter members 914. The diverter members 914 are positioned by the belt 922 to direct the bagged food products either into engagement with the discharge conveyor 906 of the conveyor assembly 902 or the discharge conveyor 906 of the conveyor assembly 904. In the case of larger sizes of bagged food products, the diverter members 914 direct the bagged food products along a centrally disposed path comprising component parts of both of the discharge conveyors 906.

FIGS. 29 and 30 illustrate an air assisted collator 950 comprising a first variation of the fourth embodiment of the invention. The collator 950 differs from the collator 900 in that it includes a wide belt discharge conveyor 952 as opposed to the multiple belts 910 of the discharge conveyors 906 of the collator 900. As is best illustrated in FIG. 30, the discharge conveyor 952 includes a first, relatively long component 954 and a second, relatively short component 956 which receives bagged food products from the long component 954. A gap 958 is provided between the long component 954 and the short component 956 of the discharge conveyor 952 to facilitate elimination of trash resulting, for example, from broken food product bags.

The collator 950 further includes a receiving conveyor 962 which may comprise a single belt. Alternatively, dual receiving conveyor belts may be utilized in the collator 950 in a manner similar to that illustrated in FIG. 21.

Although preferred embodiments of the present invention have been illustrated in the accompanying drawings and described in the foregoing detailed description, it will be understood that the invention is not limited to the embodiments disclosed but is capable of numerous rearrangements, modifications and substitutions of parts and elements without departing from the spirit of the invention.

What is claimed is:

1. A collator for bagged food products comprising:

spaced, parallel bagged food product receiving conveyors;

spaced, parallel bagged food product discharge conveyors each for sequentially receiving bagged food products and for discharging the received bagged food products onto one of the bagged food product receiving conveyors;

a diverter for receiving bagged food products and for selectively directing received bagged food products onto one or the other of the spaced, parallel bagged food product discharge conveyors;

the diverter comprising spaced, parallel diverter members;

means supporting the diverter members for pivotal movement about spaced, parallel, vertically extending axes;

means for selectively pivoting the diverter members about the vertically extending axes;

the diverter member positioning means comprising a belt operatively connected to the diverter members and extending around a predetermined track, and a drive mechanism for selectively moving the belt around the predetermined track and thereby positioning the diverter members.

* * * * *

UNITED STATES PATENT AND TRADEMARK OFFICE
CERTIFICATE OF CORRECTION

PATENT NO. : 6,837,361 B2
DATED : January 4, 2005
INVENTOR(S) : John M. Singleton et al.

It is certified that error appears in the above-identified patent and that said Letters Patent is hereby corrected as shown below:

Column 6,
Line 59, replace "medium about k" with -- medium about ½ --.

Column 7,
Line 44, replace "is established 5 between" with -- is established between --.

Signed and Sealed this

Twenty-fourth Day of May, 2005

JON W. DUDAS
*Director of the United States Patent and Trademark Office*